United States Patent [19]
Roberts et al.

[11] Patent Number: 6,058,999
[45] Date of Patent: May 9, 2000

[54] TIRE MANUFACTURING DRUM HAVING SIMULTANEOUS AXIAL AND RADIAL ADJUSTABILITY

[75] Inventors: Clark A. Roberts; Mark S. Byerley, both of Greenback, Tenn.

[73] Assignee: Wyko, Inc., Greenback, Tenn.

[21] Appl. No.: 09/072,246

[22] Filed: May 4, 1998

[51] Int. Cl.[7] .................................................. B29D 30/24
[52] U.S. Cl. .......................... 156/415; 156/417; 156/420
[58] Field of Search .................................... 156/415, 420, 156/414, 417–419; 249/178, 180

[56] References Cited

U.S. PATENT DOCUMENTS

| | | | |
|---|---|---|---|
| 2,614,057 | 10/1952 | Ericson et al. | 156/420 |
| 3,547,733 | 12/1970 | Leblond | 156/415 |
| 4,220,494 | 9/1980 | Kawaida et al. | |
| 4,425,180 | 1/1984 | Samokhvalov et al. | |
| 4,445,962 | 5/1984 | Felder | |

*Primary Examiner*—Geoffrey L. Knable
*Attorney, Agent, or Firm*—Pitts & Brittian, P.C.

[57] ABSTRACT

A rotatable drum (10) for use in the manufacture of vehicle tires, the drum including a plurality of segments which collectively define an outer circumference (32) of the drum. The segments are divided into first and second end portions (15,17) which are individually mounted for axial and radial movement between expanded and retracted positions relative to the rotational axis (16) of the drum. Each end portion of segments is further divided into first and second groupings (23,25), the segments (18,18') of the first and second groupings (23,25) being disposed in alternating juxtaposition with respect to the segments of the second grouping (18') and with the segments of the first grouping being movable axially further and radially faster than the segments of the second grouping as the segments are moved between their expanded and retracted positions so that the segments of the second grouping are received in overlying relationship to the segments of the first grouping as the segments of the first and second groupings are simultaneously moved radially inward toward the rotational axis of the drum. A third grouping 23 of the segments of each end portion of segments is provided for, with these segments (19,19') being received in overlying relationship to the segments of the first and second groupings. Further, in a preferred embodiment, each segment is provided with a shell member (24,26), with the shell members collectively defining the outer cylindrical surface (32) of the drum. A method for the production of a rotatable cylindrical drum (10) and a method for the manufacture of an OTR vehicle tire are disclosed.

7 Claims, 19 Drawing Sheets

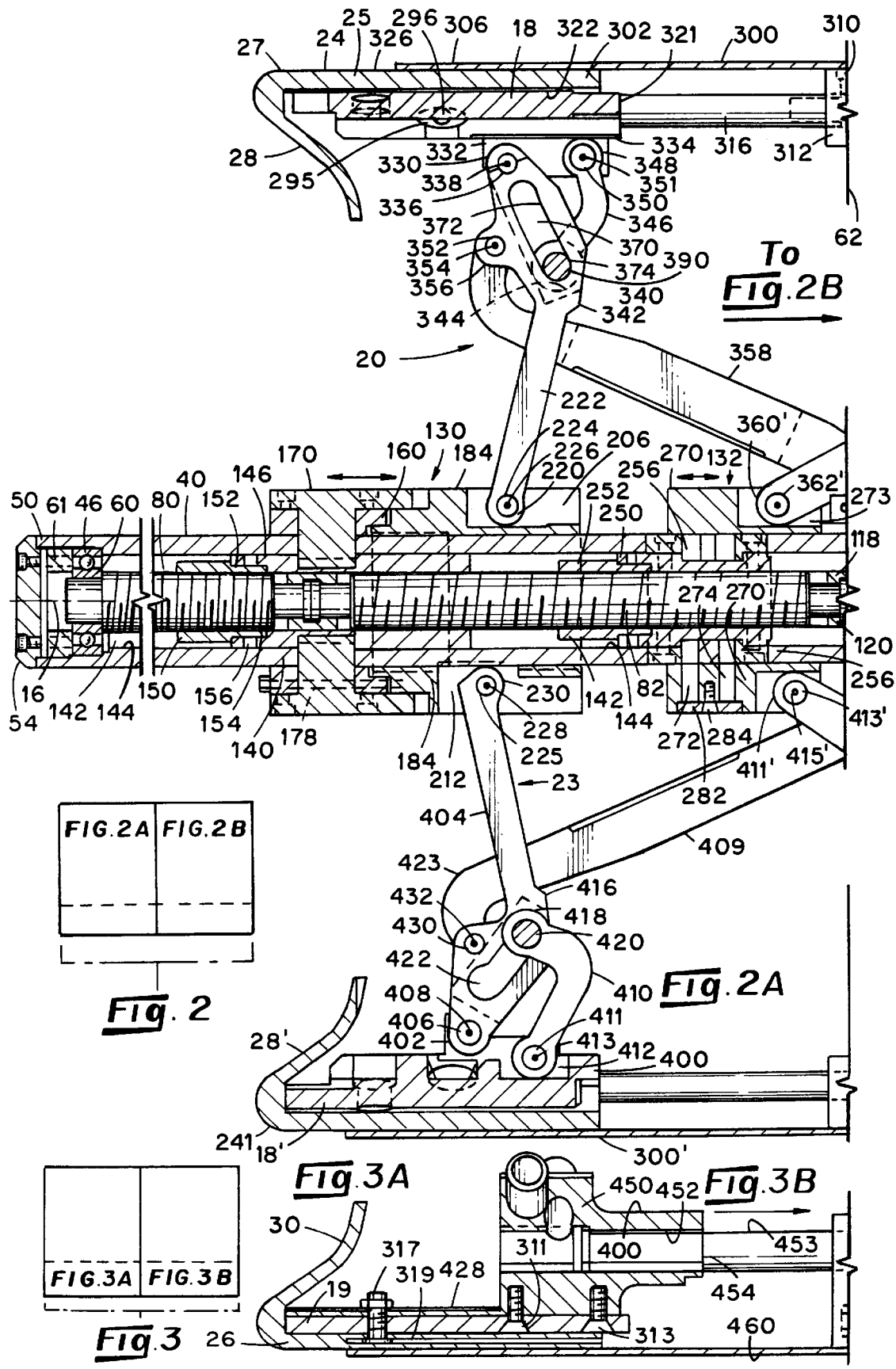

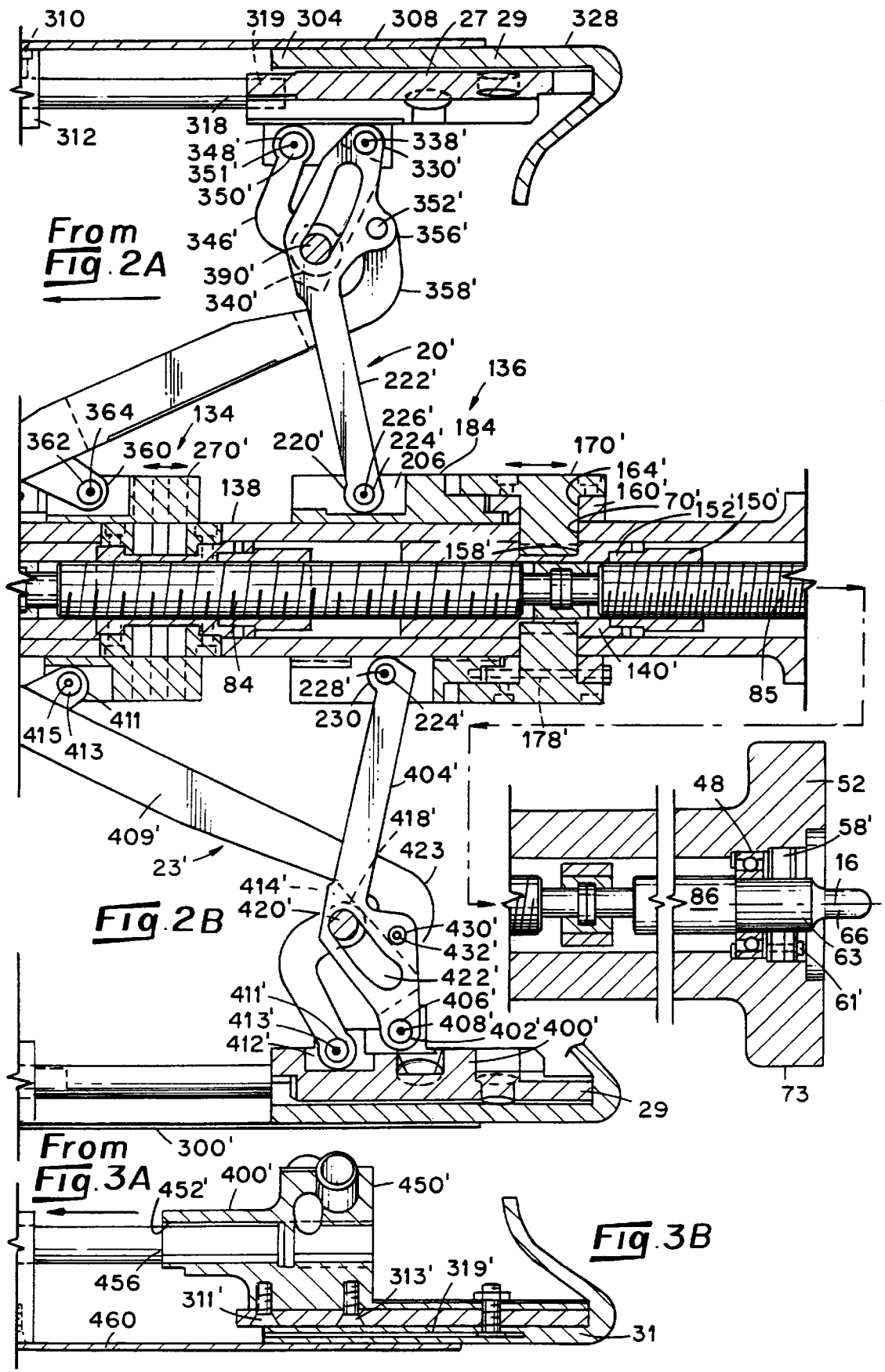

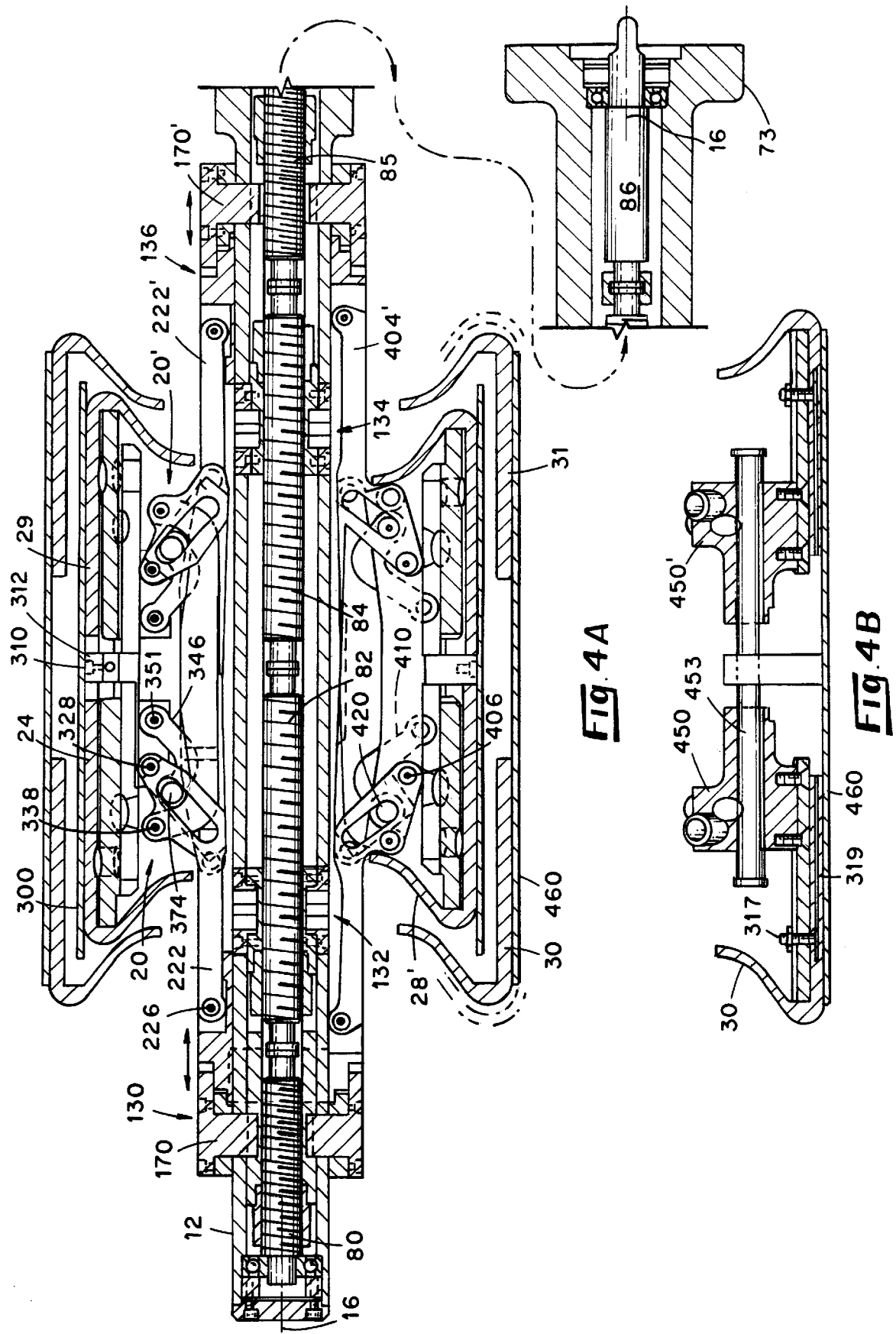

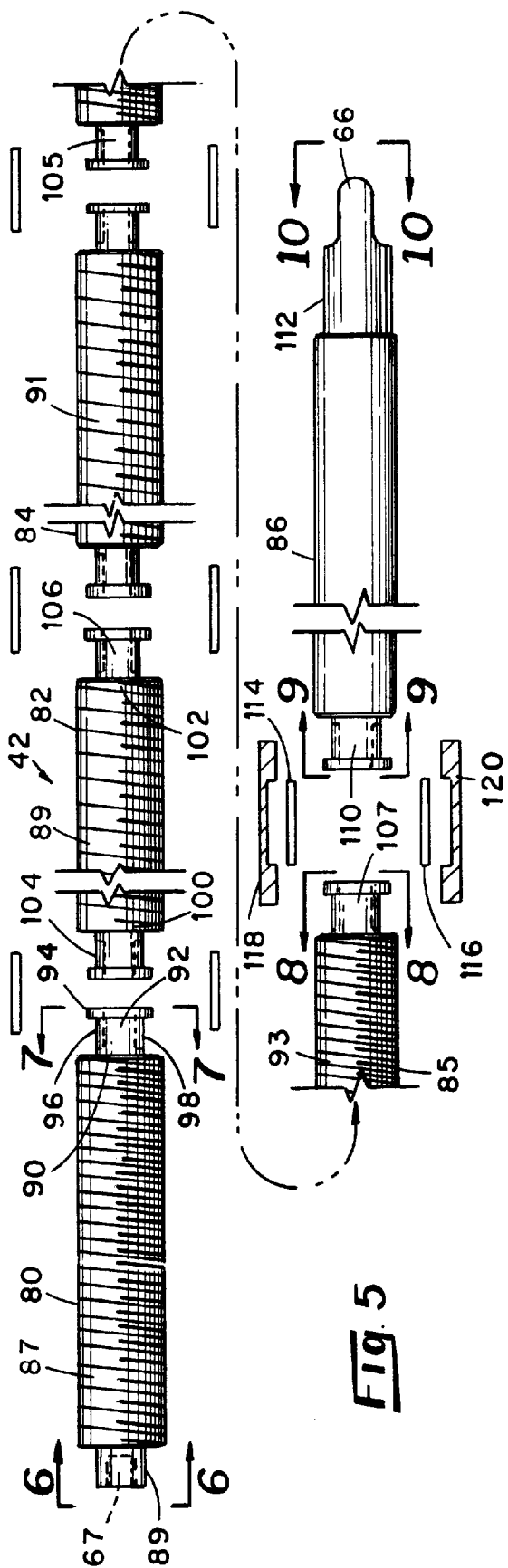

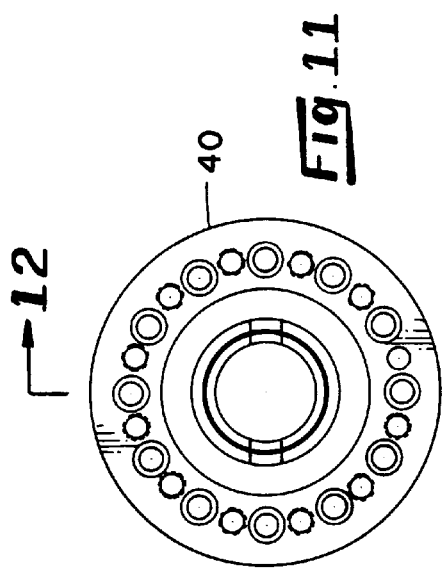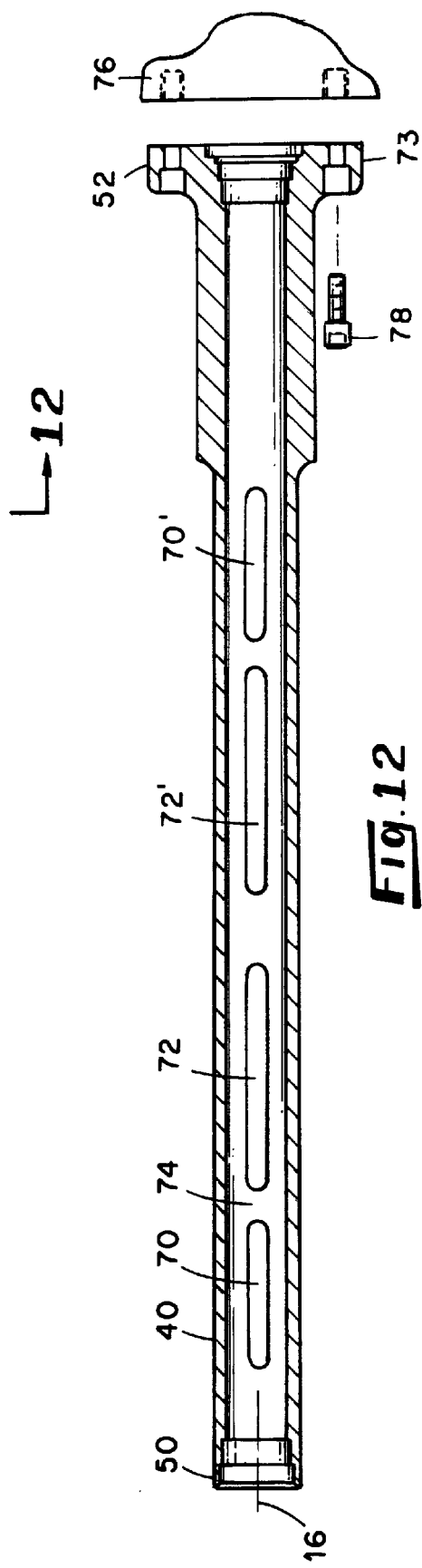

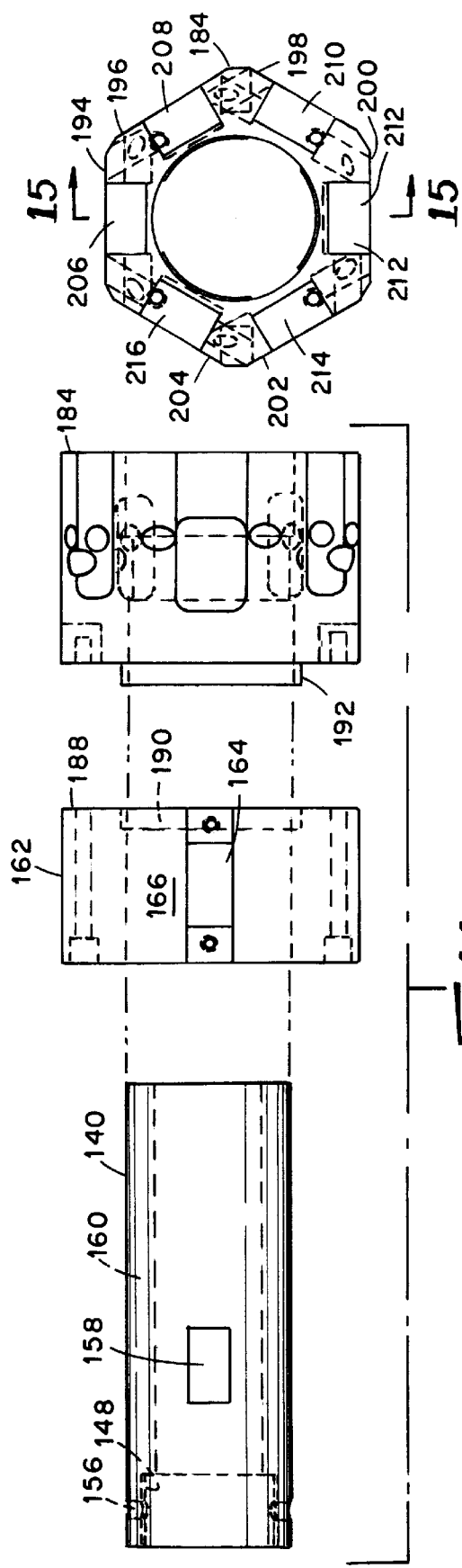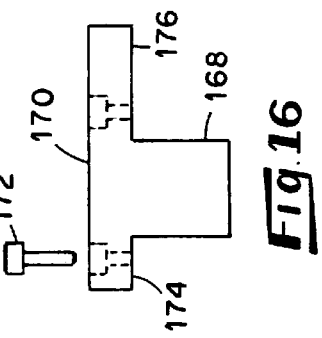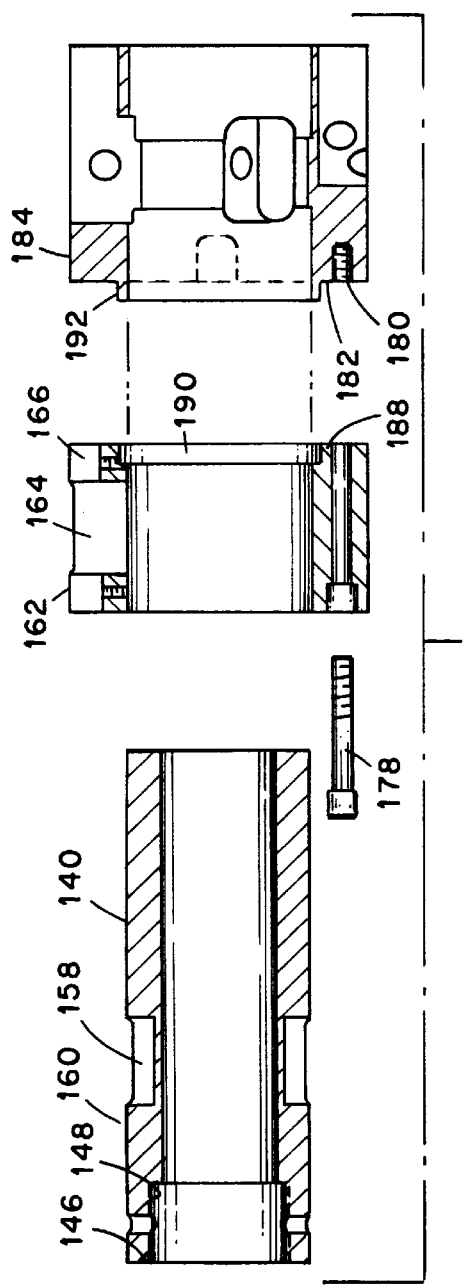

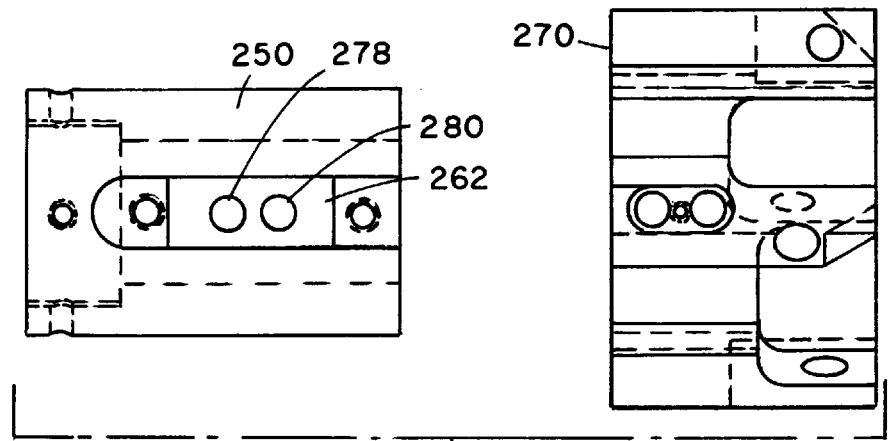
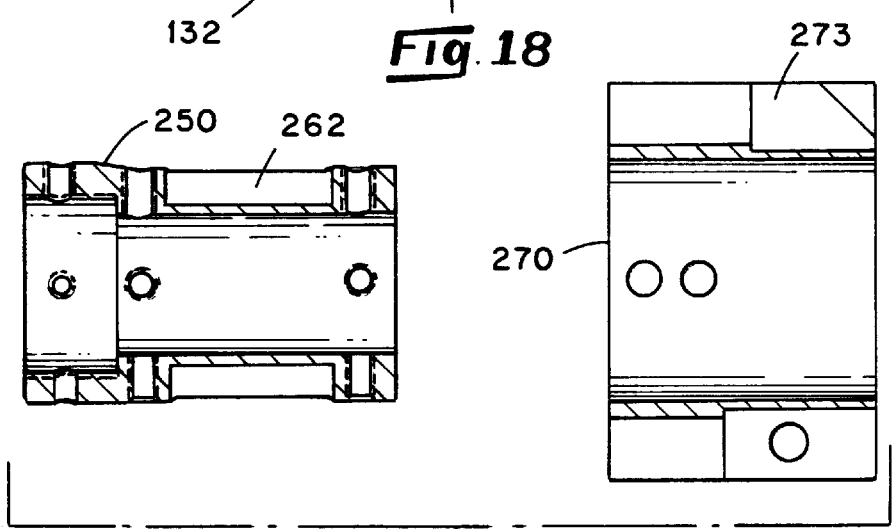
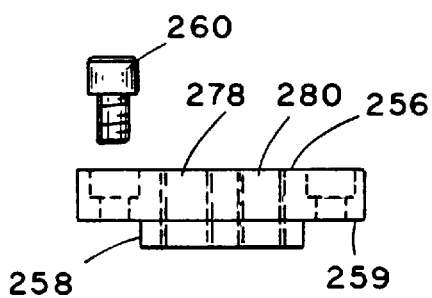
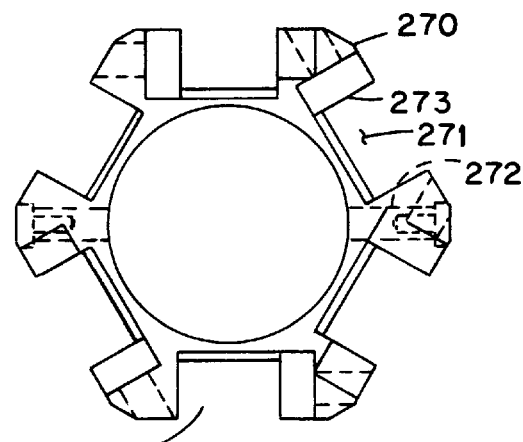

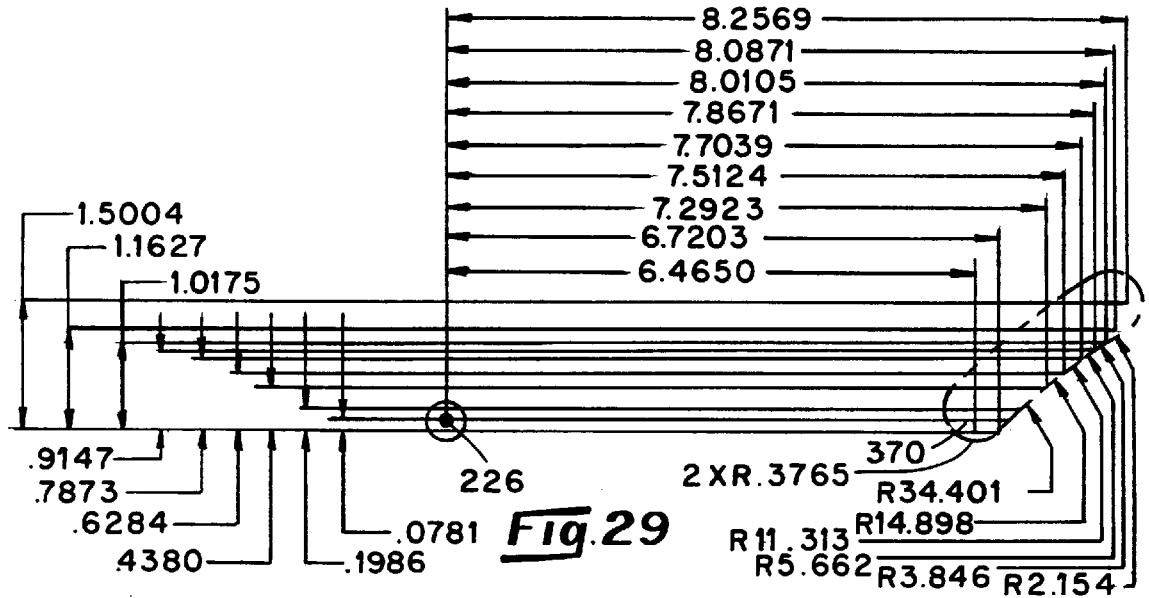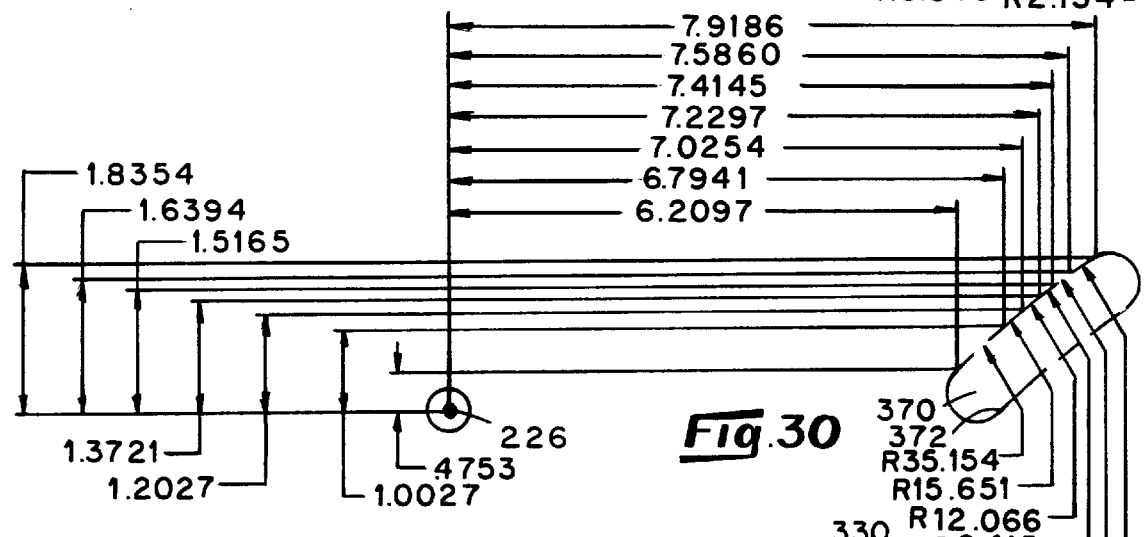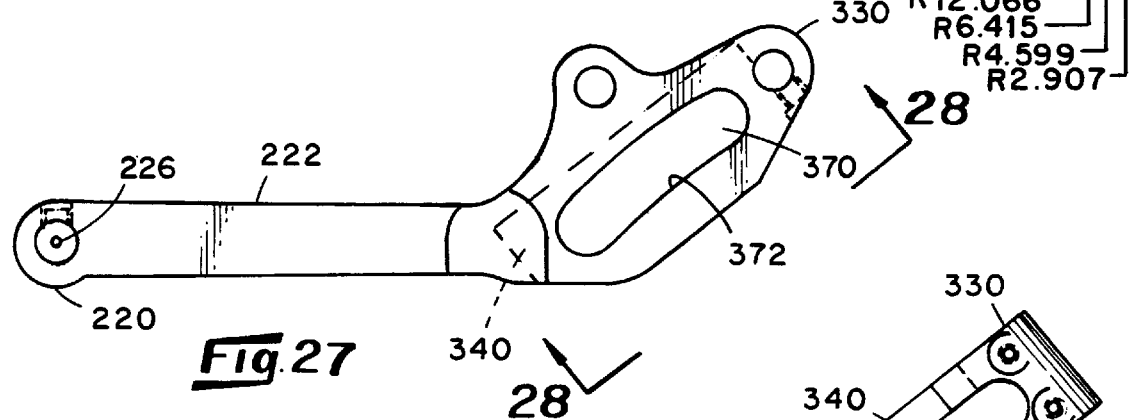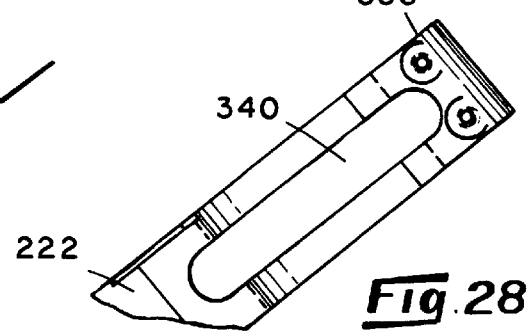

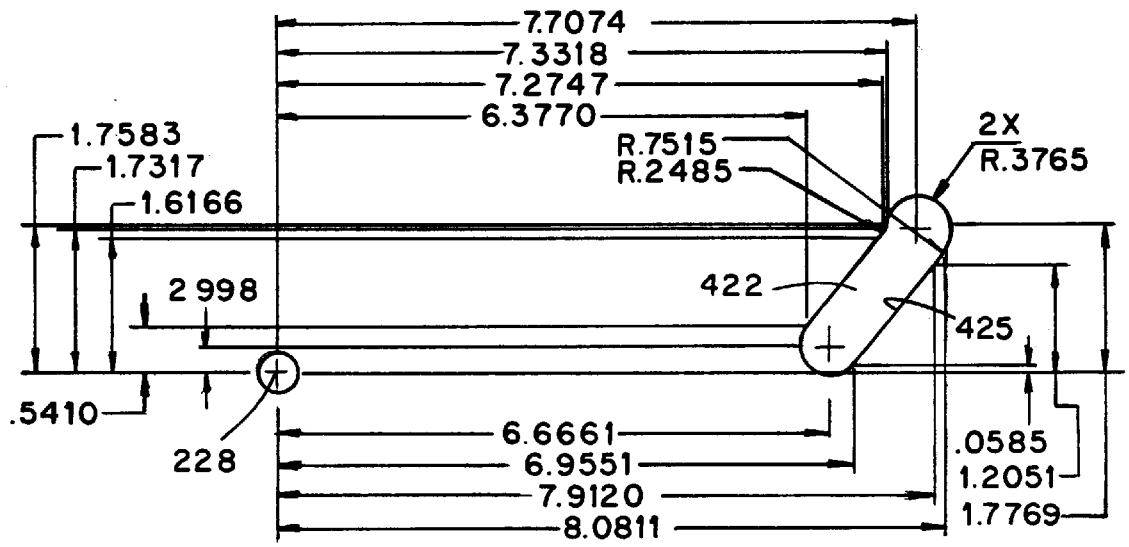
Fig. 34
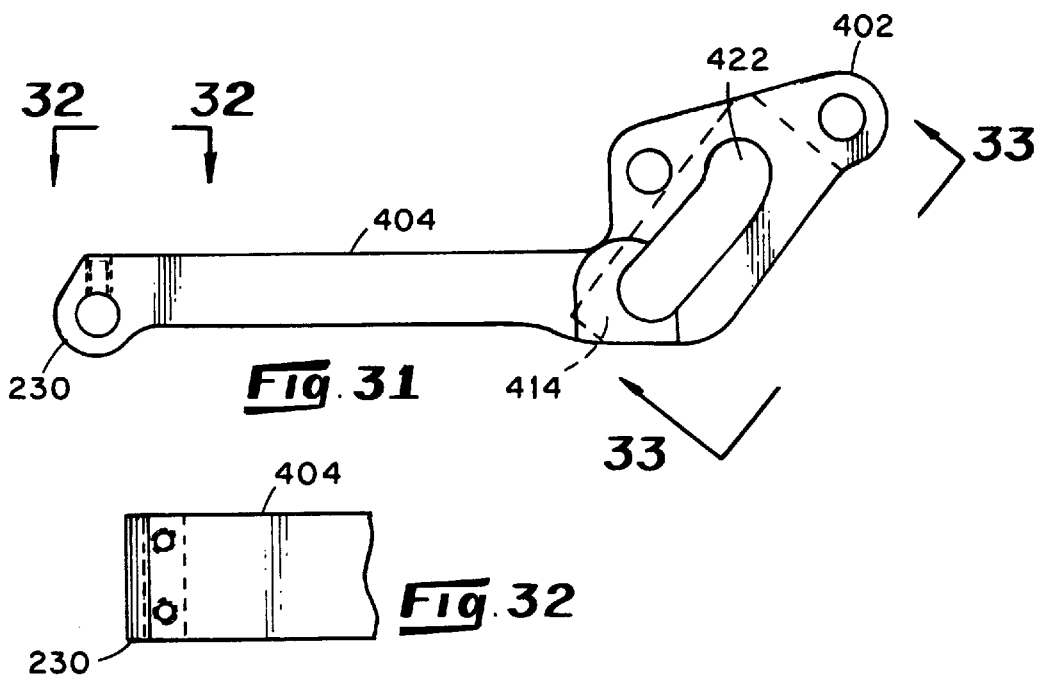
Fig. 31
Fig. 32
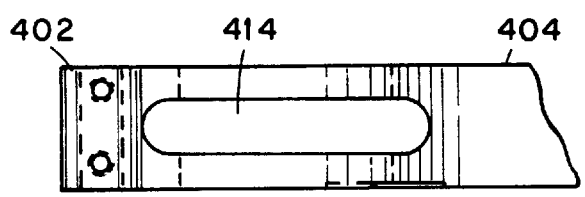
Fig. 33

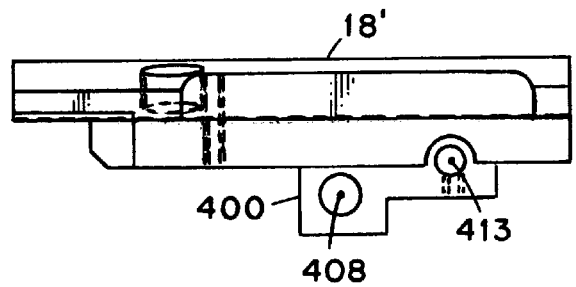
Fig. 39
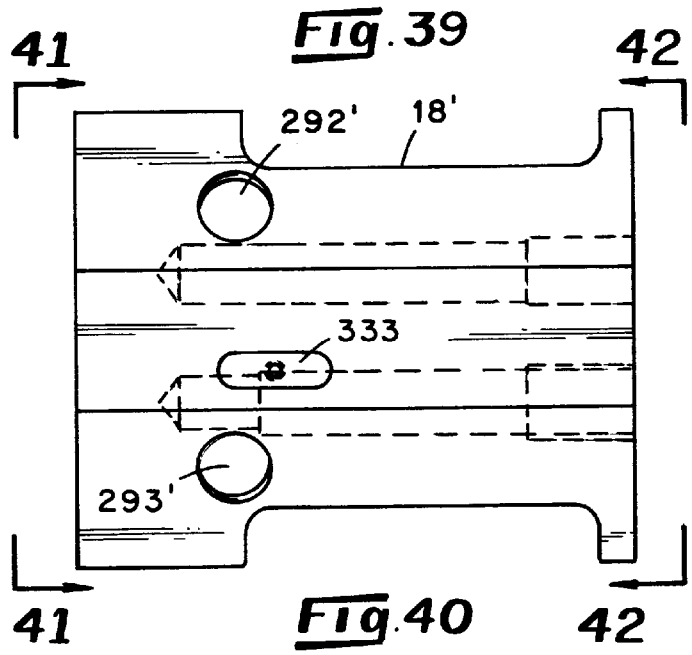
Fig. 40
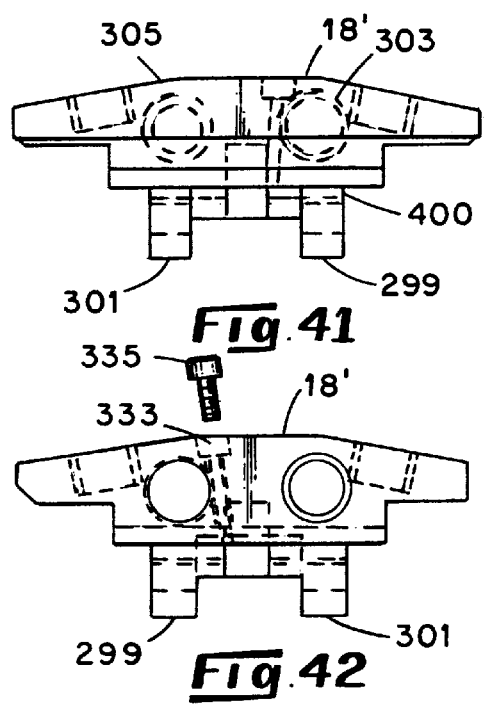
Fig. 41
Fig. 42

TIRE MANUFACTURING DRUM HAVING SIMULTANEOUS AXIAL AND RADIAL ADJUSTABILITY

BACKGROUND OF INVENTION

This invention relates to apparatus for use in the manufacture of vehicle tires, especially off-the-road (OTR) tires, (including aircraft tires) and to methods for the manufacture of such tires.

In the manufacture of vehicle tires it is common practice to fabricate a tire in steps or "stages". Most usually, the multiple stages employed are carried out on different pieces of apparatus and the product(s) from one stage are transferred to a different stage of operation for further work on the product and/or combination of this product with a further product.

In one example, the manufacture of a vehicle tire includes the step of forming a carcass for the tire on a first piece of apparatus, forming a belt and tread package for the tire on a separate piece of apparatus, and thereafter marrying the belt and tread package to the carcass, commonly employing a further piece of apparatus, to form a "green" tire. In the manufacture of either of the carcass or the belt and tread package, the apparatus includes a cylindrical drum having a rotational axis and an outer cylindrical surface onto which the belt and tread package, for example, is formed. Removal of the formed carcass or belt and tread package from their respective drum requires reduction of the circumference of the drum to release the formed carcass or belt and tread package and provide clearance between the outer circumference of the drum and the inner circumference of the carcass or belt and tread package sufficient to permit removal of the carcass or the belt and tread package from their respective drum. This capability of the drum is most frequently provided for by forming the drum of a shell which includes a plurality of segments, each of which includes a shell member that exhibits an outer arcuate surface. These shells are mounted for radial movement relative to the longitudinal (rotatational) axis of the drum, and when expanded to their radially outward positions, the segments cooperatively define the outer cylindrical working surface of the drum.

In the formation of OTR tires, particularly, it is common to form the green tire on a single drum. In this operation, an inner liner and multiple body plies (bias laid and up to 18 or more plies in an aircraft tire, for example), and one or more belt plies and a tread ply, are laid up on a rotating drum. These tires most frequently include multiple, nonexpansible, usually metallic, bead rings which ultimately form the beads of the tire that mate with the outer rims of the vehicle wheel. This process usually involves the laying down of the inner liner and one or more of the body plies. These plies are wider than the width of the drum so that their opposite side edges project beyond the respective ends of the drum. The process of application and insertion of the multiple bead rings commonly involves the steps of folding the side edges of the plies around their respective ends of the drum, followed by placement of a bead ring adjacent each end of the drum and in engagement with the now radially inwardly extending side edges of the plies. The radial position of the bead ring is chosen to leave about one-half of the side edges of the plies available for folding about the bead ring and radially outwardly of the drum, hence back upon themselves, where the terminal edges of these side edges is married (bonded) to the plies that are overlaid on the drum. This process of laying down one or more body plies, positioning of a bead ring, folding of the plies about the bead ring and back upon themselves, and their bonding to themselves is repeated for each bead ring that is added to the tire. For aircraft tires which may includes eighteen or more body plies, there may be as many as five or six body plies overwrapping each bead ring. It is thus apparent that the inner diameter of the green tire is substantially less than the diameter of the bead rings, so that for a tire which in intended to fit a 20 inch diameter wheel rim, the inner diameter of the green tire on the drum may be as small as 18 inches, for example. Thus, in the manufacture of an OTR tire, there is imposed on the drum a requirement that the drum be collapsible to a greater extent than those drums which are employed in the manufacture of tires having lessor thickness of inner liner, body plies, belt and tread packages, and/or fewer bead rings, etc. In addition to this increased requirement of collapsibility to a relative small diameter, the size and weight of OTR tires imposes a greater strength requirement upon the working elements of the drum as compared to drums for use in the manufacture of lessor sized tires, such as automobile tires. As an additional factor, the relatively great weight of the OTR tires also makes it necessary that the green tire be easily removed from the drum inasmuch as the weight of the OTR green tire does not lend itself to manual manipulation of the tire in an effort to remove it from the drum, as is possible in certain smaller sized (and lighter weight) tires.

Collapsible tire-building drums are well-known in the art. However, in the instance of OTR and similar tires, there is an extensive undercut of the sidewalls relative to the body of the tire. Due to the severity of this undercut it is also necessary that the drum be collapsable longitudinally, i.e., axially, of its length dimension, i.e., in a direction parallel to the longitudinal (rotational) axis of the drum.

In certain prior art, such as disclosed in U.S. Pat. No. 4,445,962, collapse of the drum in the aforedescribed manner requires at least partial dismantlement of the drum so as to provide space internally of the drum into which the circumference-defining segments thereof can be radially collapsed for reducing the diameter of the drum (as opposed to collapse of the drum in a longitudinal (axial) direction) by the necessary relatively high ratio of desired tire outer diameter to the inner diameter of the sidewalls of the tire. Dismantlement, even partial, of the drum increases the cost of manufacture of a tire due to the time involved in dismantlement and reassembly of the drum, and exposes an operator to inordinate danger in the handling of the relatively large and heavy segments of the drum.

One prior art technique suggested in U.S. Pat. No. 4,425,180 for providing for clearance between the ends of the segments and the undercut bead-bearing margins of the green tire has been to design at least alternate ones of the segments with articulated ends and provide for inwardly articulation of the ends simultaneously with the radial movement of the segments. This design suffers from the complicated mechanisms required to effect the articulation, hence inordinate cost of manufacture and maintenance of the drum, and the lack of strength afforded by the articulated ends during such operations as stitching of the sidewalls of a green tire. Further, the presence of the articulated ends of the segments occupies space internally of the drum and limits the extent of permissible reduction in the diameter of the drum.

In U.S. Pat. No. 4,220,494, it is suggested that each segment of the drum be formed from a central section and opposite end sections. Each end section is slidably mounted on the central section to permit axial spacing of the end sections to select different drum widths. The mechanism for effecting this sliding movement includes a splined shaft received in the hollow center of a spiral gear associated with a respective end section. Rotation of the splined shaft effects axial change in the spacing of the end sections, hence change in the width of the drum.

Each central section is connected by links to first and second hubs disposed on a central double-directionally threaded lead screw of the drum such that rotation of the lead screw effects movements of the two hubs in opposite directions along the length of the lead screw. Each of the two end sections of each segment are connected by links to opposite ones of the links which connect the central section to the hub. Rotation of the central lead screw effects axial movement of the hubs and resultant radial movement of the central section. By reason of the linked connection of the end sections to their respective central section, radial movement of the central section further results in sliding movement of the end sections in an axial direction to clear the end sections relative to the undercut bead-bearing margins of the green tire. This mechanism is also subject to excessive costs of manufacture and maintenance as well as potentially inadequate strength to withstand stitching and like operations on the sidewalls of the green tire. Also, this mechanism only provides for equal axial and radial movement of all the segments that go to make up the drum and thereby is limited in the extent of permissible reduction in the diameter of the drum.

It is therefore an object of the present invention to provide a rotatable drum for use in the manufacture of a cylindrical or toroidal product in which the drum is exandable or collapsible both axially and radially of its rotational axis.

It is another object of the present invention to provide a drum which is useful in the manufacture of vehicle tires, particularly off-the-road vehicle tires.

It is another object to provide a method for the manufacture of vehicle tires, particularly off-the-road vehicle tires.

Other objects and advantages of the present invention will be recognized by one skilled in the art given the present description of the present invention, including the claims and figures in which:

FIG. 1 is a representation of an end view of a drum of expanded diameter embodying various of the features of the present invention;

FIG. 2, comprising 2A and 2B, is a side elevational view, in section, of the drum of FIG. 1 expanded to its maximum diameter, and taken generally along the line 2—2 of FIG. 1, FIG. 2A depicting one end of the drum and FIG. 2B depicting the opposite end of the drum;

FIG. 3, comprising 3A and 3B, is a side elevational view, in section, taken generally along the line 3—3 of FIG. 1, FIG. 3A depicting a wide segment and a portion of its mounting on one end of the drum and FIG. 3B depicting the counterpart wide segment and a portion of its mounting on the opposite end of the drum, the segments and their mountings being depicted separated from the drum itself;

FIG. 4A is a side elevational view, in section of the drum depicted in FIG. 2, but with the drum being contracted radially to its minimum diameter;

FIG. 4B is a side elevational view, in section, of the wide segments and their mountings as depicted in FIG. 3, but with the drum being contracted radially to its minimum diameter, the segments and their mountings being depicted as being separated from the drum itself;

FIG. 5 is an exploded view of a multi-sectional lead screw as employed in one embodiment of the present invention;

FIG. 6 is an end view of one section of the lead screw depicted in FIG. 5 and taken generally along the line 6—6 of FIG. 5;

FIG. 7 is an end view of one section of the lead screw depicted in FIG. 5 and taken generally along the line 7—7 of FIG. 5;

FIG. 8 is an end view of one section of the lead screw depicted in FIG. 5 and taken generally along the line 8—8 of FIG. 5;

FIG. 9 is an end view of one section of the lead screw depicted in FIG. 5 and taken generally along the line 9—9 of FIG. 5;

FIG. 10 is an end view of one section of the lead screw depicted in FIG. 5 and taken generally along the line 10—10 of FIG. 5;

FIG. 11 is an end view of a generally tubular central housing employed in one embodiment of the drum of the present invention;

FIG. 12 is a side elevational view, in section, of the housing depicted in FIG. 11 and taken generally along the line 12—12 of FIG. 11;

FIG. 13 is an end view of a hub employed in one embodiment of the drum of the present invention;

FIG. 14 is an exploded view, in side elevation, of various of the components of the hub depicted in FIG. 13;

FIG. 15 is an exploded view, in section and side elevation, of the hub depicted in FIG. 13, and taken generally along the line 15—15 of FIG. 13;

FIG. 16 is a side elevational view of a key employed in the hub depicted in FIGS. 13–15;

FIG. 17 is an end view of a further hub as employed in the drum of the present invention;

FIG. 18 is an exploded view, in side elevation, of various of the components of the hub depicted in FIG. 17;

FIG. 19 is an exploded view, in section and side elevation, of the hub depicted in FIG. 17, and taken generally along the line 19—19 of FIG. 17;

FIG. 20 is a side elevational view of a key employed in the hub depicted in FIG. 17;

FIG. 27 is a front elevational view of a further link employed for mounting selected segments to respective hubs of one embodiment of the drum of the present invention;

FIG. 28 is a partial side view of one end of the further link depicted in FIG. 27 and depicting a slot opening outwardly from the side of the end of the link;

FIG. 29 is a graphical representation of the cam slot in one end of the link depicted in FIG. 27 and the geometrical structure of one side of the camming surface of the cam slot and its spatial relationship to the pivot axis of the opposite end of the link;

FIG. 30 is a graphical representation of the geometrical structure of the opposite side of the camming surface of the cam slot depicted in FIG. 29 and the spatial relationship of this opposite surface to the pivot axis of the opposite end of the link;

FIG. 31 is a front elevational view of a still further link employed for mounting selected segments to respective hubs of one embodiment of the drum of the present invention;

FIG. 32 is a partial side view of one end of the link depicted in FIG. 31;

FIG. 33 is a partial side view of the opposite end of the further link depicted in FIG. 27 and depicting a slot opening outwardly from the side of this opposite end;

FIG. 34 is a graphical representation of the cam slot in one end of the link depicted in FIG. 30 and the geometrical structure of the camming surface of the cam slot and its spatial relationship to the pivot axis of the opposite end of the link;

FIG. 39 is a side view of a second narrow width segment as employed in one embodiment of the drum of the present invention;

FIG. 40 is a top plan view of the segment depicted in FIG. 39;

FIG. 41 is an end view of the segment depicted in FIG. 39 and taken generally along the line 41—41 of FIG. 39;

FIG. 42 is an end view of the segment depicted in FIG. 39 and taken generally along the line 42—42 of FIG. 39;

SUMMARY OF INVENTION

Figure 1:
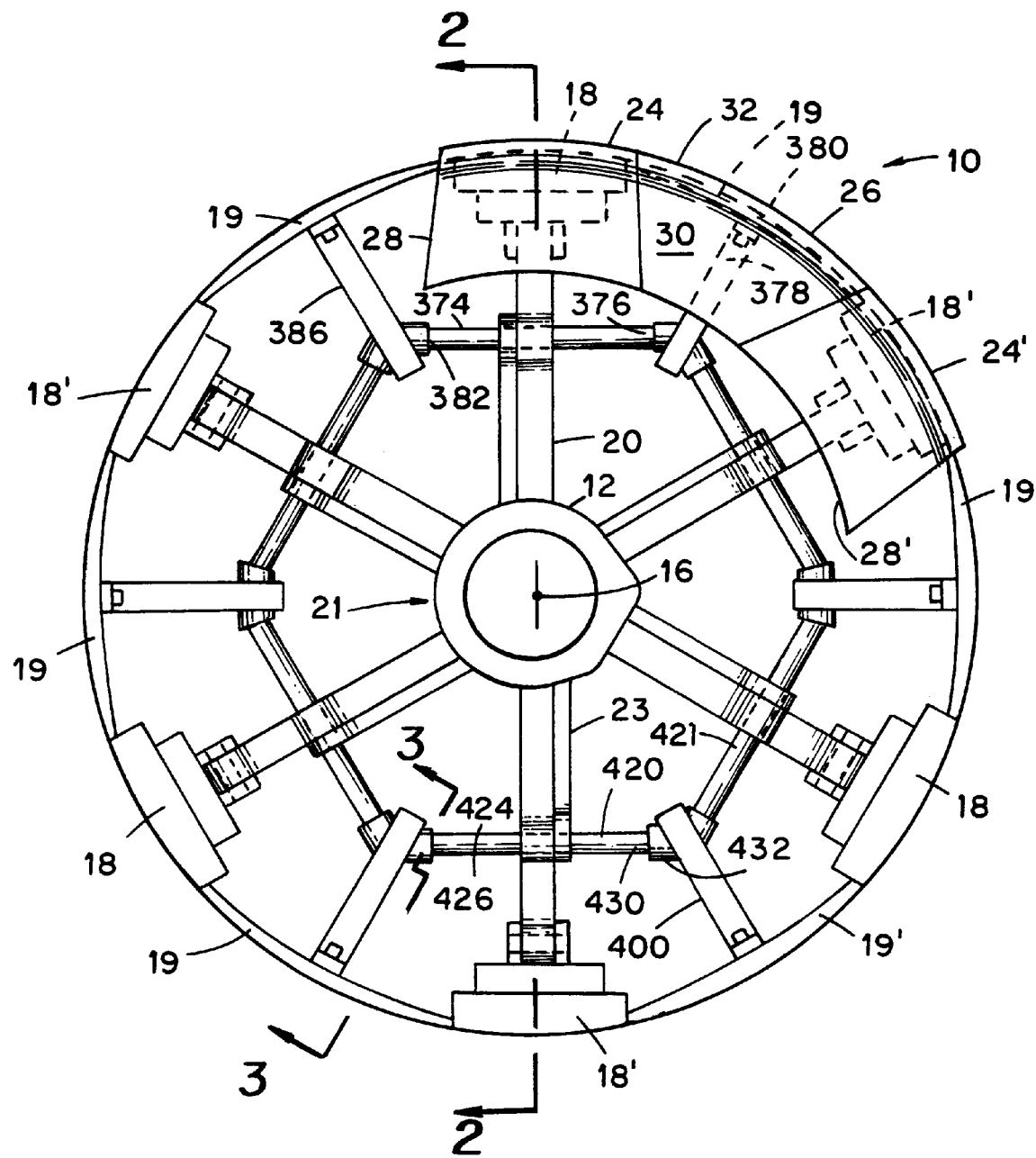

Briefly stated, the present invention comprises a drum capable of simultaneous adjustment of its diameter (circumference) and axial length. The left-hand end of the drum is substantially a mirror image of the right-hand end of the drum. For clarity, herein the present invention is described at times in terms of only one end of the drum, but it is to be understood that such description is for convenience of understanding of the invention. It will be apparent herein that certain of the elements of the drum of the present invention are common to the overall structure and/or the operation of the drum. Like elements, e.g. left hand and right hand counterparts, are at times identified by prime numerals.

The depicted embodiment of the present invention comprises a rotatable drum having an outer cylindrical surface that is collectively defined by multiple shell members that are carried by respective segments. These segments, hence their respective shell members, are movable both axially and radially of the rotational axis of the drum. In the preferred embodiment, a first end portion of the segments is mounted on one end of the drum and a second end portion of the segments is mounted on the opposite end of the drum. In the depicted embodiment, the segments on the one end of the drum are substantially a mirror image of the segments on the opposite end of the drum. The segments on each end of the drum are further divided into first and second groups of narrow segments and a group of wide segments. The segments on one end of the drum are physically separable at the transverse centerline plane of the drum from their mirror image counterparts by a distance which permits axial movement of the segments relative to one another. The open spaces between the respective end portions of respective ones of the segments are spanned by central gap shields that are common to, and function in unison with, their associated two end portions of segments. Further, it will be apparent from the present description that certain elements of the drum are common to the overall structure and/or the operation of the drum. Still further, the present invention is described herein as comprising twelve segments on each end of the drum, but it will be recognized other numbers of total segments may be employed. Still further, for convenience and clarity, at times herein the segments are referred to as defining an outer circumference of the drum, but in actual practice the effective working outer cylindrical surface of the drum is defined by the shell members.

As noted, in a preferred embodiment, the total number of segments which go to make up the outer cylindrical surface of the drum are divided into first and second end portions. Each end portion is further divided into at least two groups and commonly into three groups, depending upon the desired degree of nesting of the segments for obtaining maximum collapse of the drum to a minimum diameter. In the embodiment depicted in the Figures, each end portion of segments is divided into two groups of narrow segments and one group of wide segments. Each of the segments in the two groups of narrow segments at one end of the drum are operatively connected to first and third hubs, with their counterpart segments at the opposite end of the drum being operatively connected to the second and fourth hubs. Each of the segments in the group of wide segments is physically operatively connected to the means employed to connect their associated two end portions of narrow segments to the first and third hubs or the second and fourth hubs, respectively. Accordingly, in the preferred embodiment of the present invention, the outer cylindrical surface of the drum is made up of a total number of segments (both narrow and wide) which number is divisible by two. At least one of these halves of the total number of segments is itself also divisible by two if one desires to provide for nesting of three "layers" of segments.

Axial and radial movement of the six narrow segments of each end portion of segments is effected by means of first, second, third and fourth hubs that are mounted on a central lead screw of the drum for simultaneous movement axially and radially of the drum upon the lead screw being activated, preferably from a location externally of the drum. The first and second hubs are disposed on one end of the lead screw and the third and fourth hubs are mounted on the opposite end of the lead screw. All the hubs move axially of the lead screw simultaneously upon actuation of the lead screw, with the first and fourth hubs moving at a same first rate and the second and third hubs moving at a same second rate of axial movement. By design, as the first and second hubs move axially of the lead screw in one direction, the third and fourth hubs move axially of the lead screw in the opposite direction. The extent of movement of the first and fourth hubs is equal upon activation of the central lead screw, as is the extent of movement of the second and third hubs.

Three of the six narrow segments of each end portion of segments constitute a first group of segments and are mounted, via a first linkage, to the first and third hubs and the other three of this six narrow segments constitute a second group of segments and are mounted, via a second linkage, to the same first and third hubs. Each linkage comprises multiple links, pivot pins, etc., so that the term "linkage" is used to collectively identify those elements which are employed to mount a segment to its respective hubs. Through the first linkage, upon axial movement of the first and third hubs, the first group of narrow segments mounted thereon move axially and radially at a first combination of axial and radial rates of movement. Simultaneously, through the second linkage, the second group of the narrow segments mounted thereon move axially and radially at a second, and different, combination of axial and radial rates of movement. The result is that three of the six narrow segments move further axially and faster radially than the other three of the six narrow segments, in response to the same rate and extent of movements of the first and third hubs. These different rates and extent of movement of the narrow segments result in three of the segments being moved out of the path of movement of the other three of the six narrow segments thereby providing for nesting of these narrow segments as they approach the central lead screw. "Nesting" as the term is employed herein refers to the axial and radial positioning of a first group of the segments radially inwardly of the drum at a first position, positioning of a second group of the segments at a second axial and radial position so that this second group of the segments tends to overlie, at least partially, the segments of the first group. Further nesting of a third group of segments, such as a group made up of the six wide segments, at a third axial and radial position is also provided for.

The six wider segments constitute a third group and are slave-mounted to the first and second linkages which mount the six narrow segments of the first and second groups. That is, axial and radial movement of the wider segments follows the movement of the narrow segments, but the wider segments are not mounted directly to the hubs. The mounting of the wider segments includes a cam-adjusted predetermined path of movement of the wider segments as the more narrow segments move, such path permitting the narrow segments to move axially and radially out of the path of movement of the wider segments. This combination of movements provides for nesting of the wider segments radially of the more narrow segments and ultimately maximum positioning of all the segments at respective most radially inward locations as provides a minimum diameter of the drum. Reversal of the axial movement of the hubs results is opposite axial and radial movement of the segments to provide a maximum diameter of the drum as is desired for the formation of a cylindrical or toroidal product on the outer cylindrical surface of the drum.

As noted, the activation of the central lead screw effects simultaneous axial movement of all the hubs, hencee simultaneous combined axial and radial movement of all the segments. Axial and radial movement of the gap shields disposed between the first and second end portions of the segments is also effected simultaneously with the axial and radial movement of their respective end segments.

The drum of the present invention is particularly useful in the manufacture of OTR tires having a relatively great undercut of the sidewalls of a tire. A method for the manufacture of vehicle tires employing the apparatus of the present invention is provided.

DETAILED DESCRIPTION OF INVENTION

Figure 21:
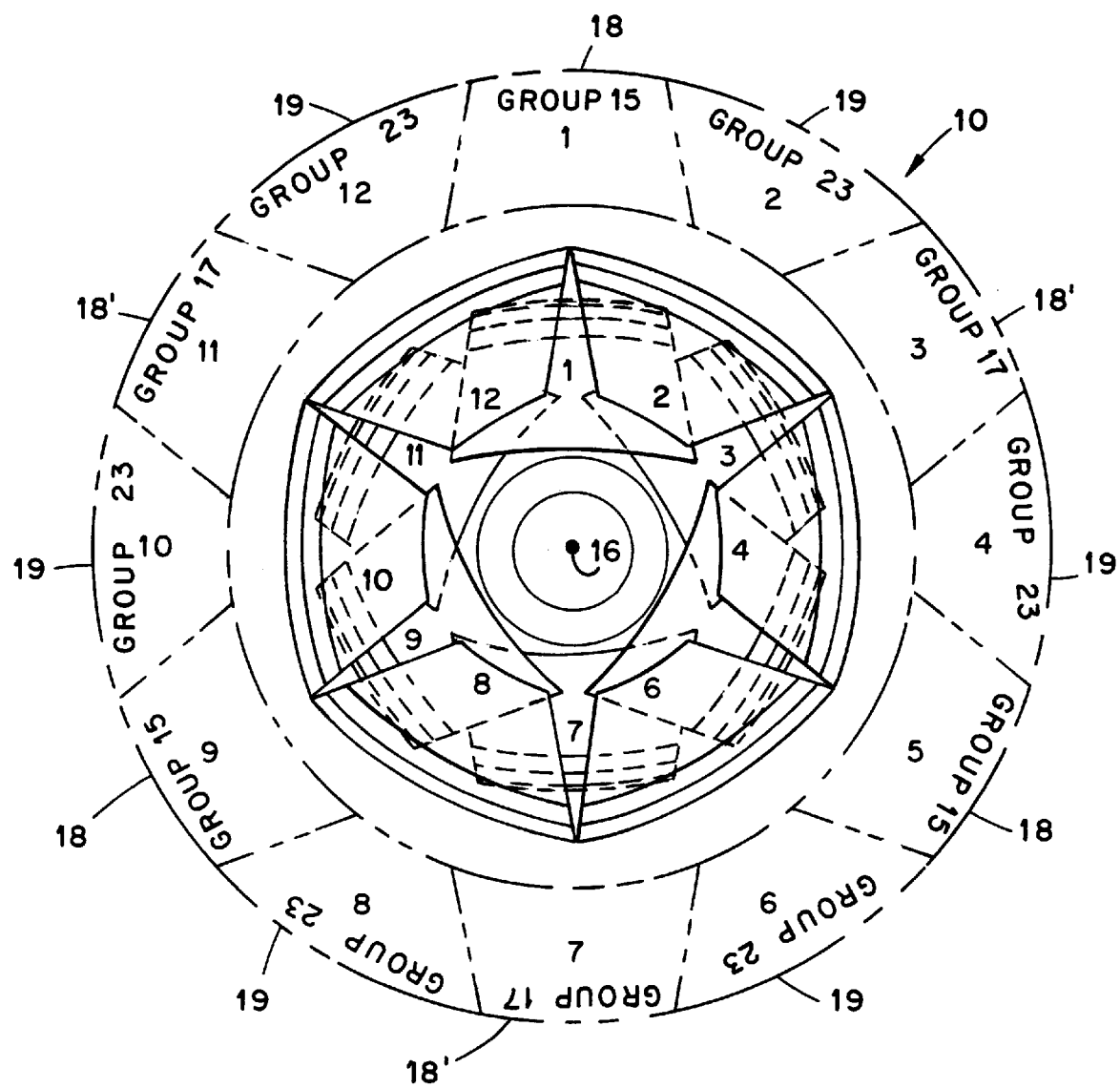
FIG. 21 is a schematic representation of an end view of a drum embodying various of the features of the present invention and depicting the nesting of the various segments when the drum is retracted to its minimum diameter and axial length, and when the drum is expanded (phantom lines) to its maximum diameter and axial length.

In FIG. 1, there is depicted an end view of one embodiment of a drum 20 in its expanded, maximum diameter, attitude and embodying various of the features of the present invention. Referring to FIGS. 1 and 21, the depicted drum 20 includes a central tubular housing, indicated generally by the numeral 21, a first plurality of narrow segments 18, and a second plurality of segments 19. All of the segments 19 are alike and are wider than the segments 18. As depicted in FIG. 21, the total depicted segments 1–12 make up one end portion of segments. The odd-numbered narrow segments 1,5 and 9 make up a first group 15 of narrow segments. The odd-numbered narrow segments 3,7 and 11 make up a second group 17 of narrow segments. The even-numbered segments 2,4,6,8,10 and 12 make up a third group 23 of wide segments. All of the narrow segments are substantially alike, but they are divided into two groups based upon their relative axial and radial movements. The narrow segments in group 15 are designated with the numeral 18 and the narrow segments in the group 17 are designated with the numeral 18'. The wide segments in group 23 are designated with the numeral 19. It is to be noted that the segments depicted in FIG. 1 have mirror-image duplicates on the opposite end of the drum. In FIG. 1, three of the segments are depicted as each including a shell member 24, 26 and 24' removably mounted on the segments. Each shell member includes an inwardly directed flange portion 28, 30 and 28'. Whereas only three segments of FIG. 1 are depicted with shell numbers, in actual practice, all of the segments are provided with respective shell members. When the drum is expanded to its maximum diameter, neighboring ones of the shell members abut one another to collectively define an outer cylindrical surface 32 of the drum. This feature is depicted schematically in FIG. 21.

As depicted in FIG. 2, each of the segments is directly or indirectly mounted to respective ones of a plurality of hubs 130, 132, 134 and 136, each of which is mounted for movement axially of the rotational axis (longitudinal centerline) 16 of the drum.

Figure 46:
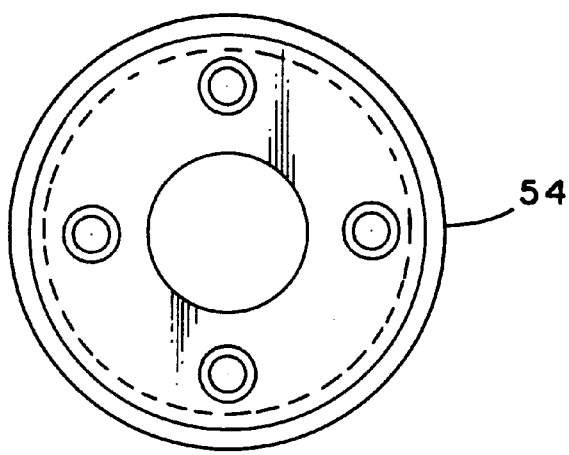
FIG. 46 is a plan view of a cap employed to close one end of the housing depicted in FIG. 12.
Figure 47:
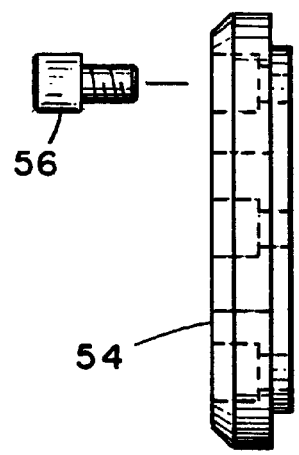
FIG. 47 is a side view of the cap depicted in FIG. 46.
Figure 48:
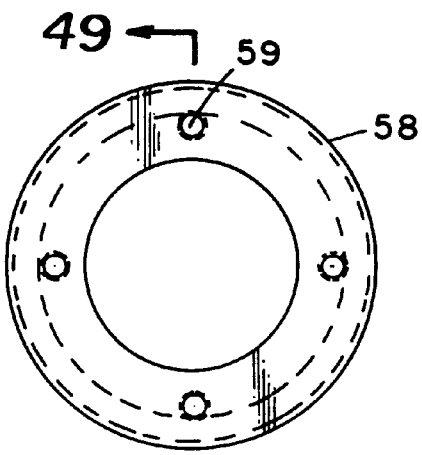
FIG. 48 is a plan view of an adjustment nut employed in alignment of a lead screw disposed within the housing depicted in FIG. 12.
Figure 49:
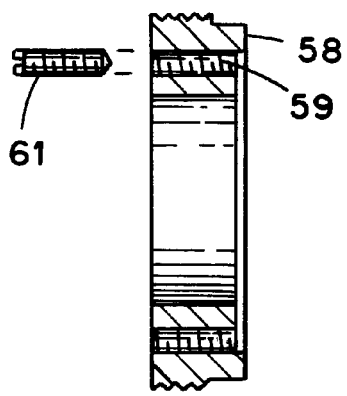
FIG. 49 is a side view, in section, of the adjustment nut depicted in FIG. 48 and taken generally along the line 49—49 of FIG. 48.
Figure 50:
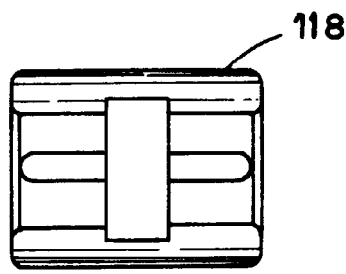
FIG. 50 is a plan view of a hemispherical collar employed to interlock abutting ends of the sections of the lead screw depicted in FIG. 5.
Figure 51:
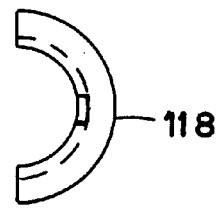
FIG. 51 is an end view of the collar depicted in FIG. 50.
Figure 52:
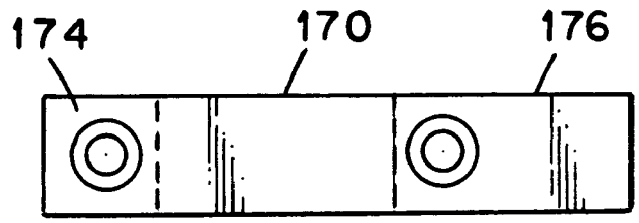
FIG. 52 is a top view of the pin depicted in FIG. 16.
Figure 53:
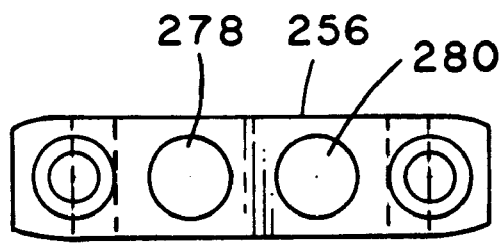
FIG. 53 is a top view of the pin depicted in FIG. 20.

A sectional view of the drum of FIG. 1 is depicted in FIG. 2. The section line 2—2 of FIG. 1 is noted to pass through the transverse midplane of the segment 18 at the one o'clock position in FIG. 1 and through the transverse midplane of the segment 18' at the six o'clock position in FIG. 1. With reference to FIG. 2 in particular, in the depicted drum the central housing 40, which is generally tubular in form, serves to receive internally thereof a lead screw 42 (also see FIGS. 5–10) rotatably mounted within and concentrically of the housing 21 as by means of bearings 46 and 48 disposed at each of the opposite ends 50 and 52 of the housing. The end 50 the housing is closed as by a cap 54 (also see FIGS. 46.47) which is removable mounted to the end of the housing 21. Internally of the end 50 of the housing there is mounted a collar 58 (also see FIGS. 48,49) at a location adjacent the end 60 of the lead screw 42 and between the lead screw end and the bearing 46. This collar is provided with a plurality of set screws 61 that are threadably mounted in through openings 59 in the collar such that these screws can be employed to apply thrust forces to the end 60 of the lead screw 42 for axial positioning of the lead screw by a relatively small distance, as needed for aligning of the lead screw 42 with respect to the transverse center plane 62 of the drum. The opposite end 52 of the housing is provided with a like collar 58' and like set screws 61' for like purposes. The end 63 of the lead screw 42 projects outside the housing 21 to define a drive tang 66 to be employed for rotating the lead screw 42 within the housing 21.

In the depicted embodiment, and referring to FIGS. 2 and 5, the lead screw 42 is made up of five sections 80, 82, 84, 85 and 86 for convenience of assembly and manufacture. If desired, the lead screw could be formed as a single member. With particular reference to FIG. 5, the depicted lead screw includes a first section 80 having an end portion 89 of reduced diameter to be received within the bearing 46. The opposite and inboard end 90 of the first section includes a reduced diameter stub shaft portion 92 which terminates in a circumferential shoulder 94. Keyways 96 and 98 are provided at 180 degree locations on the circumference of the stub shaft portion 92.

The second section 82 of the lead screw 42 is interposed between and in axial alignment with the first 80 and third 84 sections. Each of the opposite ends 100 and 102 of the second section is provided with a stub shaft portion 104 and 106, respectively, which are essentially identical to the stub shaft portion 92 on the first section 80, including the provision of keyways at 180 degree locations about the circumference of each stub shaft portion. The third section 84 of the lead screw 42 is essentially identical to the second section 82, and the fourth section 85 of the lead screw is essentially identical to the first section 80 except the fourth section includes stub shaft portions 105 and 107 at its opposite ends.

The fifth section 86 of the lead screw 42 includes a stub shaft portion 110 that is essentially identical to the stub shaft section 92, including keyways at 180 degree locations about the circumference of the stub shaft portion 110. The opposite and outboard end 112 of the fifth section 86 extends externally of the end 52 of the housing to define a tang 66 by means of which the lead screw 42 may be rotated within the housing 21.

The five sections of the lead screw 42 are assembled by aligning the sections axially and in end-to-end relationship and with their respective adjacent keyways in their respective abutting stub shaft portions aligned to receive therein respective keys 114 and 116 (typical). Preferably, the abutting ends of adjacent ones of the assembled sections, with their keys in place, are fitted with first and second semicircular caps 118 and 120 (typical) to aid in retention of the keys in their respective keyways, particularly during assembly of the lead screw and its insertion into the housing 21. As depicted in FIG. 2B, the caps 118 may be secured in place as by a collar 117 provided in encircling relationship with the caps.

Each of the first, second, third and fourth sections 80, 82, 84 and 85, respectively, of the lead screw 42 is externally threaded as indicated by the numerals 87, 89, 91 and 93, respectively. The threads 87 and 93 on sections 80 and 85 are identical to one another in pitch and numbers of threads per inch, and the threads 89 and 91 on sections 82 and 84 are identical to one another in pitch and numbers of threads per inch. The threads 89 and 91 are of a greater pitch and of a (lessor number of threads per inch (e.g. a pitch of ⅜" and 2.66 threads per inch)) than the pitch and number of threads per inch of the threads 87 and 93 (e.g. a pitch of ¼" and 4 threads per inch). The threads 87 and 89 on the first and second sections are reverse (left) in hand to the threads 91 and 93 on the third and fourth sections of the lead screw.

With particular reference to FIGS. 11 and 12, the tubular housing 21 is provided with through slots 70 and 72 in the wall 74 of the housing. These slots are aligned with the rotational axis 16 of the housing and located between the transverse centerplane 62 of the drum and the end 50 of the lead screw. Like slots 70' and 72' are provided through the wall of the housing between the transverse centerplane and the opposite end 52 of the housing. The end 52 of the housing is provided with a circumferential flange 73 adapted to permit mounting of the housing 21 to a drive source 76, by means of bolts 78 (typical), for rotation of the drum, and selective rotation of the lead screw within the housing to expand and contract the diameter of the drum such as during cycling of a production operation employing the drum.

Referring to FIG. 2, first, second, third and fourth hubs 130, 132, 134 and 136 are mounted in encircling relationship to the outer surface 138 of the housing 21 and in limited axially sliding relationship to the housing.

Figure 59:
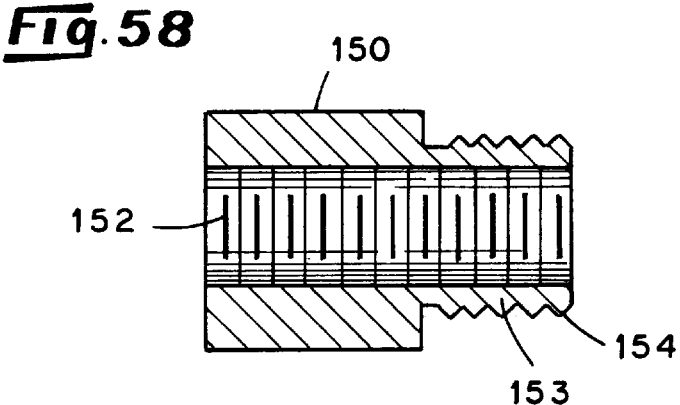
FIG. 59 is a sectional view of a drive nut which is associated with each of the hubs of the depicted embodiment of the present invention.

Referring to FIGS. 2 and 13–16, the first hub 130 includes an elongated drive sleeve 140 which encircles the lead screw 42 and is slidably disposed between the threaded outer surface 142 of the lead screw 42 and the inner surface 144 of the housing 21. At its outboard end 146, this sleeve is provided with internal threads 148. A drive nut 150 (see FIG. 59) having internal threads 152 which register with the external threads 87 on the lead screw section 80, is mounted on the lead screw 42. This drive nut includes a reduced diameter end portion 153 which includes external threads 154 such that this end portion of the drive nut is threadably received within the outboard end 146 of the sleeve. Set screws may be provided to lock the drive nut to the sleeve so that axial movement of the drive nut upon rotation of the lead screw 42 produces axial sliding movement of the sleeve along the housing 21. This sleeve is further provided with a blind key slot 158 provided in its outer surface 160. A cylindrical drive collar 162 having a through slot 164 through its wall 166 is mounted in encircling relationship to the outer surface of the housing 21 at a location such that the through slot 164 is in alignment with the through slot 70 through the wall of the housing and in alignment with blind key slot 158 in the wall of the drive sleeve. The leg 168 of a key 170 of generally "T-shape" profile is inserted through the aligned slots 164 in the drive collar and the slot 70 in the housing, thence into the blind key slot 158 provided in the sleeve 140, thereby locking the sleeve 140 against rotation relative to the housing 21. The through slot 70 in the housing is of a length greater than the width of the leg 168 of the key 170 so that the hub 130 is free to slide axially of the housing by a distance set by the length of the through slot 70 (see FIG. 12). The key is secured in position by means of screws 172 extending through the cross legs 174 and 176 of the key and into the drive collar. Further, the drive collar is provided with a plurality of bolts 178 (typical) that pass through the thickness dimension of the collar and threadably engage internally threaded bores 180 (typical) in the face 182 of a linkage mounting sleeve 184 that is mounted in encircling and axially slidable relationship to the outer surface 138 of the housing 21 and contiguous to the drive collar 162 to interlock the drive collar and the mounting sleeve to one another at a selectable extent of separation therebetween, as desired for alignment purposes. In the depicted embodiment, the face 180 of the drive collar 162 is provided with a circular depression 190 for the receipt therein of a reduced diameter projection 192 on the face 182 of the mounting sleeve 184. As noted, for alignment purposes, the face 188 of the drive collar may be spaced apart from the adjacent face 182 of the mounting sleeve by a small distance. This distance is selectable through adjustment of the bolts 178.

With reference to FIGS. 2, 13 and 14, the depicted linkage mounting collar 184 is provided with a plurality of flat faces, 194, 196, 198, 200, 202, and 204 which collectively define the outer surface 202 of the collar. As depicted, each face is provided with a cutout 206, 208, 210, 212, 214 and 216, respectively, each cutout being designed to receive and pivotally anchor, as by a pivot pin 224, one end 220 of a link 222 (typical) associated with the mounting of one of the more narrow segments 18 to the hub 130. Only the linkage 20 (typical) of the more narrow segments 18 of the drum are mounted to the hub 130. More particularly, in the depicted embodiment which employs six of the more narrow segments, three of the segments are linked to the cutouts 206, 210, and 214. The other three of the six segments are linked to the cutouts 208, 212, and 216 so that the linkage mountings are made to alternating cutouts. In this respect, it is to be noted that the pivot axis 226 for the link end 220 associated with the cutout 206 is disposed more axially inboard on the drive collar than the pivot axis 228 for the end 230 of the link 232 associated with the cutout 212 on the face 200 of the mounting collar 184. Thus, it will be recognized that axial movement of the mounting collar 184 will result in movement of the linkages 20 associated with three of the segments 18 that is different from the movement of the linkages 23 associated with the other three of the segments 18'. This difference in movement is of importance in establishing different rates and extents of axial and radial movement of three of the narrow segments 18 relative to the other three 18' of these six narrow segments as is required to achieve the desired nesting of these segments upon collapse of the diameter of the drum. It is noted that the choice of the number of segments employed to define the outer surface of the drum may be different for drums of larger or smaller maximum/minimum diameter and that the number of faces provided on the drive collar will be altered accordingly.

As depicted in FIG. 2, the fourth hub 136 is substantially a mirror image of the hub 130 and includes a drive sleeve 140' affixed to a drive nut 150' which is threadably mounted on the fourth section 85 of the lead screw 42. The drive sleeve 140' is encircled by a drive collar 160' which is interlocked to the sleeve 140' by means of a key 70' that passes through a slot 164' in the drive collar, through a slot 70' in the wall of the housing 21, thence into a blind slot 158' in the drive sleeve. The length of the slot 70' is identical to the length of the slot 70 so that the hub 134 is axially slidable along the housing 21 in the same manner and to the same extent as is the hub 70. The hub 134 further includes a mounting collar 184' that is a mirror image of the mounting collar 184. The ends 220' and 230' of linkages 20' and 23', respectively, are pivotally mounted to the mounting collar 184'. As noted hereinbefore, the threads on the lead screw section 85 are different in hand to the threads on the lead screw section 80, but otherwise of the same pitch and number of threads per inch. Accordingly, upon rotation of the lead screw 42, the hubs 130 and 136 move axially of the rotational axis of the drum at equal rates of travel and by equal distances, but in different directions.

With reference to FIGS. 2 and 17–20, and similar to the first hub 130, the second hub 132 includes a drive sleeve 250 fixedly mounted to a drive nut 252 that is threadably mounted on the second section 82 of the lead screw 42. The drive sleeve is interlocked with the housing 21, and precluded from rotational movement relative to the housing, by means of a "T"-shaped key 256 which includes a leg portion 258 that extends through through the slot 72 through the wall of the Liz housing 21, thence into a blind slot 262 in the outer surface 264 of the drive sleeve 250. The cross arm portion 259 of the key is embedded in the slot 72 and fixedly secured to the housing as by set screws 260 (typical). The drive sleeve of this second hub is shorter than the drive sleeve of the first ad hub and its associated slot 72 in the housing is longer than the slot 70 associated with the first hub so that the second hub is capable of a greater axial range of travel than is the first hub. The range of axial travel of the second hub is further enhanced by reason of the outboard end 266 of the drive nut 252 being receivable within the annular space 268 between the lead screw and the inner wall 144 of the housing 21.

Further, the second hub 132 includes an annular mounting collar 270 which is disposed in encircling relationship to the housing 21 in the area of the key 256 and secured in position as by means of pins 272 and 274 which pass through the wall 276 of the mounting collar and into registered bores 278 and 280 in the key 256. A retainer 282 (typical), held in place as by a screw 284, covers the outboard ends of the pins and retains the same within their respective bores. The mounting collar 270 is provided with a plurality of cutouts 271 (typical) disposed equally spaced apart about the circumference of the mounting collar. Each cutout 271 defines a wall section 273 to which there is pivotally mounted one end of a link 358' as more fully described hereinafter.

The third hub 134 is substantially a mirror image of the second hub 132 and includes a drive sleeve 250' fixedly mounted to a drive nut 252' that is threadably mounted on the third section 84 of the lead screw 42. The drive sleeve 250' is interlocked with the housing 21, and precluded from rotational movement relative to the housing, by means of a "T"-shaped key 256' which includes a leg portion 258' that extends through through the slot 72' through the wall of the housing 21, thence into a blind slot in the outer surface of the drive sleeve 250'. The cross arm portion of the key is embedded in the slot 72 and fixedly secured to the housing as by set screws 260' (typical). The drive sleeve of this third hub is shorter than the drive sleeve of the fourth hub and its associated slot 70' in the housing is longer than the slot 72' associated with the fourth hub so that the third hub is capable of a greater axial range of travel than is the fourth hub. The range of axial travel of the third hub is further enhanced by reason of the outboard end 266' of the drive nut 252' being receiveable within the annular space 268' between the lead screw and the inner wall 144 of the housing 21.

Further, the third hub 134 includes an annular mounting collar 270' which is disposed in encircling relationship to the housing 21 in the area of the key 256' and secured in position as by means of pins 272' and 274' which pass through the wall of the mounting collar and into registered bores in the key 256'. A retainer covers the outboard ends of the pins and retains the same within their respective bores. The mounting collar 270' is provided with a plurality of cutouts 271' (typical) disposed equally spaced apart about the circumference of the mounting collar. Each cutout defines a wall section 273' to which there is pivotally mounted one end of a link 358 as more fully described hereinafter.

As noted hereinabove, the hand of the threads at opposite ends of the lead screw 42 are reversed. That is, the threads on that portion of the lead screw which is disposed on the left hand side of the transverse centerplane 62 of the drum (as viewed in FIG. 2) are of one hand (either right or left), while the threads on that portion of the lead screw which is disposed on the right hand side of the transverse centerplane are of the opposite hand. Thus, upon rotation of the lead screw, the first and second hubs move axially in a first direction while the third and fourth hubs move axially in a second and opposite direction. The threads on the lead screw are chosen such that, upon rotation of the lead screw 42, the rate and extent of axial movement of the first and fourth hubs are essentially identical, and the rate and extent of axial movement of the second and third hubs are essentially identical. However, that portion of the lead screw threads engaged by the drive nuts for the first and fourth hubs are different in pitch and threads per inch from that portion of the threads engaged by the drive nuts for the second and third hubs, so that the rate and extent of axial movement of the first and fourth hubs is slower and of a lesser axial distance, than the rate and extent of axial movement of the second and third hubs, for any given rotation of the lead screw. In any event, the movements of the hubs occur simultaneously. This arrangement of the hubs and lead screw threads, in combination with the linkages which connect the segments to the hubs, provides for movement of the respective segments axially and radially of the drum at different speeds and distances for any given rotation of the lead screw, hence provides for selected ones of the segments to be moved axially and radially of the drum faster and further than other selected ones of the segments. As will be apparent hereinafter, through mounting of still further selected ones of the segments to the linkage associated with the other and further selected ones of the segments, as opposed to being connected directly to the hubs, the present inventors provide for an even different rate and extent of axial and radial movement of such still further selected ones of the segments. The end result is close nesting of the segments when the drum is collapsed to its minimum diameter, and positioning of the adjacent segments when the drum is expanded to its maximum diameter to define a substantially continuous cylindrical surface of the drum.

Figure 54:
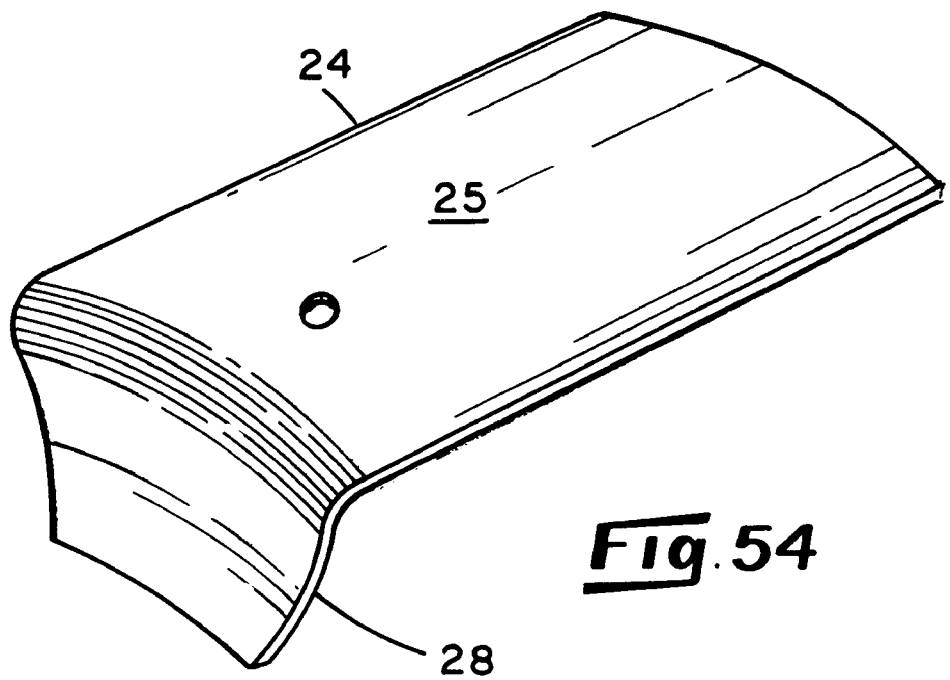
FIG. 54 is a perspective representation of a typical shell member employed in one embodiment of the drum of the present invention.
Figure 56:
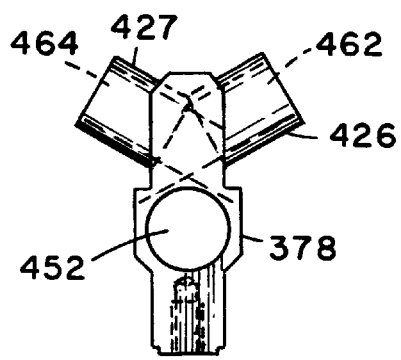
FIG. 56 is a left hand end view of the mounting lug of FIG. 55.
Figure 55:
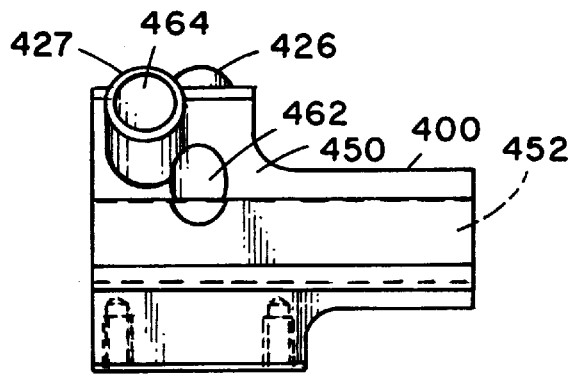
FIG. 55 is a side view of one embodiment of a mounting lug, as also seen in FIG. 2A, for a wide segment of the drum of the present invention.
Figure 58:
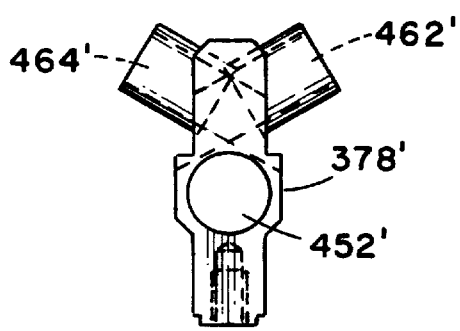
FIG. 58 is a right hand end view of the mounting lug of FIG. 57.
Figure 57:
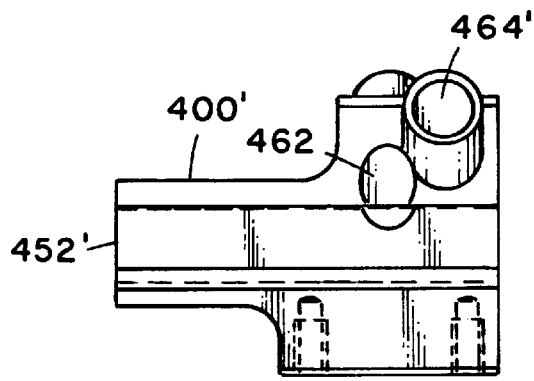
FIG. 57 is a side view of a further mounting lug, as also seen in FIG. 2B, for a wide segment of the drum of the present invention.

Whereas reference hereinabove has been made to those segments disposed on a first end of the drum, it is to be recalled that the opposite end of the drum is substantially a mirror image of the first end. As depicted in FIG. 1, each segment 18, 18' and 19 is adapted to receive thereon a removable shell member 24 (typical). Whereas reference is also made to the segments moving axially and radially of the drum, it is to be understood that any movement of the segments produces corresponding movement of the shells attached thereto. Referring to FIGS. 1, 2 and 54, each of the shells of the present invention includes an arcuate body portion 25 and an end flange 28 which projects radially inwardly of the drum and wraps the outboard end 27 (typical) of their respective segments. This end flange serves as a base against which body plies, for example, are deformed to define the side walls and beads of a vehicle tire. The present drum therefore is useful when forming vehicle tires in which the tread or sidewall width of the finished tire is substantially wider than the separation distance between the bead rings on opposite sides of the tire. In this latter situation, in order to remove the green tire from the drum, it becomes necessary to both collapse the drum radially and also to reduce the axial width of the drum sufficiently to permit the side walls to pass the shell flanges for removal of the formed green tire from the drum.

In FIG. 2A, there is depicted, in the top half of the Figure, in section, only one segment 18 of the first subgroup 15 of narrow end segments at one end (left hand as viewed in FIG. 2A) of the drum. The counterpart narrow end segment 27 at the opposite (right hand) end of the drum is depicted in the top half of FIG. 2B. In the bottom half of FIG. 2A, there is depicted, in section, only one 18' of the second subgroup 17 of narrow end segments. Its counterpart narrow end segment 29 at the opposite end of the drum is depicted in FIG. 2B. FIG. 3A depicts, in section, one of the segments 19 of the wider segments of the third group 23 of segments. Its counterpart wide segment 31 at the opposite end of the drum is depicted in FIG. 3B. FIGS. 3A and 3B represent a sectional view taken generally along the line 3B—3B of FIG. 1.

With particular reference to FIGS. 2 and 35–38, in the depicted embodiment of the drum of the present invention, three of the narrow segments of subgroup 15 comprise a first segment 18 (typical) as depicted in FIGS. 35–38. This segment 18 includes a body portion 290 having an arcuate outer surface 291. Through bores 292 and 293 through the thickness of the body portion of the segments serve to receive therein headed bolts (not shown) for anchoring the shell member 24 thereto. A through slot 295 through the thickness of the segment receives therein a bolt 296 for securing a mounting lug 332 to the inner surface of the segment. This mounting lug includes first and second legs 297 and 298 disposed in side-by-side relationship to pivotally receive therebetween one end 330 of the link 222 and one end 348 of the stub link 346.

Further, referring to FIGS. 2 and 39–42, the second group 17 of three narrow segments comprises a segment 18' (typical) which is substantially identical to the segment 18. The segment 18' differs from the segment 18 with respect to their respective mounting lugs 332 and 400. Specifically, the mounting lug 400 of the segment 18', similarly to the mounting lug 332 of the segment 18, includes first and second legs 299 and 301 which define pivotal locations for the end 402 of the link 404 and for the end 412 of the stub link 410. As best seen in FIG. 2, the pivotal location of the end 402 of the link 404 is more radially inward (toward the rotational axis 16) of the drum than is the pivot location of the end 330 of the link 222 so that the radial movement of the segment 18' is caused to occur at a different rate and to a different axial extent than the rate and axial extent of movement of the segment 18 for any given rotation of the lead screw 42. Further, the segment 18' includes throughbores 292' and 293' through the thickness of the body portion of the segments serve to receive therein headed bolts for anchoring the shell member 24 to the segment. A through slot 333 through the thickness of the segment receives therein a bolt 335 for securing the mounting lug 400 to the inner surface of the segment.

Still further, the six wide segments of group 23 each comprise a segment 19 (typical) as depicted in FIGS. 3 and 43–45. The segment 19 comprises a body portion 303 having an arcuate outer surface 305. Each segment 19 further includes first and second through bores 307 and 309 through its thickness for the receipt therethrough of bolts 311 and 313 which engage a mounting lug 400 (see FIGS. 1 and 3A) to removably mount the segment on the mounting lug. A further throughbore 315 is provided through the thickness of the segment 19 for the receipt therethrough of a headed bolt 317 which extends into a lateral T-slot 319 in the inner surface of a shell 26 and serves to removably mount the shell to the segment (see FIG. 3A).

With reference to FIG. 2 and 21, in the depicted embodiment of the present invention which includes twelve segments, six of the segments 18,18' are of a first (narrow) width and the remaining six segments 19 are of a second (wide) width. The six narrow segments 18, 18' are further divided into two groups 15 and 17 of three narrow segments per group. In FIG. 2, which is a sectional view taken generally along the line 2—2 of FIG. 1, there is depicted a narrow segment 18 disposed on the left-hand end of the drum (as viewed in FIG. 2) and a mirror image segment 27 disposed on the right hand end of the drum. Each of segments 18 and 27 carries a shell member 24 and 29, respectively, thereon. Between these oppositely disposed segments and their respective shell members, there is an open space when the drum is expanded. In one embodiment, this space is spanned by a gap shield 300 between each of the segments of one end portion and each of the counterpart segments of the opposite end portion of segments. Gap shields 300' and 460 span the open space between segments 18' and 29 and 19 and 31, respectively. Each gap shield spans the separation space between its associated end segments and further overlies the outer surfaces of the inboard ends of its associated end segments. The preferred gap shield is relatively thin , e.g. about 0.1 inch thick and is of like width as its respective segment to minimize any effect of the gap shield upon the profile or structural integrity of the product (e.g. a vehicle tire) being formed on the outer surface of the drum. The gap shield 300 is of a length greater than the maximum spatial separation of the inboard ends 302 and 304 of the shell members 24 and 29 when the segments 18 and 27 are disposed in their most radially outward positions. This length of the gap shield 300 is sufficient to provide for its opposite ends 306 and 308 to overlie the respective ends 302 and 304 of, and be supported by, the shell members 24 and 29 when the drum is fully expanded diametrically.

Each gap shield is mounted between its respective end segments by means of rods 316, for example, which extend between the end segments. A carrier bracket 312 is mounted on these rods, rod 316 for example, and extends radially therefrom to receive a gap shield 300 mounted thereon. The carrier bracket is pinned to rod 316 so that axial movement of a rod results in axial movement of a gap shield mounted on the carrier bracket. One end 318 of the rod 316 is telescopically and slidably received within a bore 317 opening axially inboard of the end 319 of one of the segments, for example segment 27. The opposite end 320 of the rod 316 is slidably received in a bore 322 which opens outwardly of the inboard end 321 of the opposing segment 18 to permit the tubular slide 314 to enter the bore in the annular space between the outer circumference of the rod and the inner circumference of the bore. For establishing a central position of the carrier bracket when the drum is fully expanded, the carrier bracket is bolted 324 to the rod 316 at a central location thereon. The carrier bracket thus moves with its mounting rod 316 while its desired central position between the facing inboard ends of the shell numbers 24 and 29 is insured as the end portion segments move axially and radially, the gap shields "floating" between their respective end segments.

By this means, the gap shield is slidable over the outer surfaces 326 and 328 of each of shell numbers 24 and 29 to the extent necessary to permit the opposing segments, and their associated shell members to move axially with respect to one another. Whereas reference is made to the gap shield being slidably with respect to the segments, it is to be understood that when the segments are provided with their respective shell members, the gap shield actually overlies the outer surfaces of the inboard ends of the shell members and slides upon these shell surfaces, not the surfaces of the segments themselves.

Interconnection of the narrow segments to their respective hubs and the interconnection of the wider segments to their respective linkage is depicted in FIGS. 2 and 3 in particular. With reference to FIG. 2, the segment 18, having a shell member 24 disposed on its outer surface 326 is interconnected to the first hub 130 as by means of linkage 20. This linkage 20 includes a first elongated link 222 whose inboard end 220 is pivotally connected to the first hub as by a pivot pin 224 having a pivot axis 226. The opposite and outboard end 330 of the link 222 is pivotally connected to a mounting lug 332 provided on the radially inward surface 334 of the segment 18, as by a pivot pin 336 having a pivot axis 338. This outboard end 332 of the link 222 is further provided with an open slot 340 on the outboard side 342 thereof which receives therein one end 344 of a stub link 346. The opposite end 348 of the stub link is pivotally mounted, as by a pivot pin 350 having a pivot axis 351, to the mounting lug 332 at a location spaced apart in an axial direction from the pivot pin 336. This stub link 346 serves to retain the segment 18 axially aligned with the drum as the segment is moved axially and radially relative to the rotational axis of the drum.

Further, the outboard end 332 of the link 222 is pivotally connected as by a pivot pin 352 having a pivot axis 354, to the outboard end 356 of a second elongated link 358. This second link extends from the pivot pin 354 to the mounting collar 270' on the third hub 134 where its inboard end 360 is pivotally connected to the mounting collar 270' as by a pivot pin 362 having a pivot axis 364. Notably, each of the pivot axes 226, 332, 338, 351, 354, and 364 are oriented perpendicular to the rotational axis 16 of the drum.

With reference also to FIGS. 1,2 and 27, the outboard end 332 of the link 222 is further provided with a cam slot 370 which extends through the thickness of the link 222 and is oriented in a radial plane of the drum. As will appear further hereinafter, this slot 370 remains in its radial plane as the link 222 is moved during collapse and expansion of the drum. Substantially the entire inner surface 372 of the slot functions as a cam for guidance of a rod 374 which is slidably received within the slot 370 and which extends from the link 222 at right angles thereto and on opposite sides of the link 222. (See FIG. 1) One end 376 of this rod 374 is slidably received in a mounting lug 378 provided on the inner surface 380 of a wide segment 19 that is disposed adjacent one side of the segment 18. The opposite end 382 of the rod is slidably received within a mounting lug 386 provided on the inner surface of a further wide segment 19 that is disposed on the opposite side of the narrow segment 18. By this means, the two wide segments that are disposed on opposite sides of the narrow segment 18 are interconnected to the linkage 20 such that upon axial and radial movement of the narrow segment, the adjacent two wide segments are caused to also move axially and radially. The diameter of the rod 374 is substantially equal to the width dimension of the cam slot 372, but the cam slot is of a length that is several times the diameter of the rod 374. Thus axial and radial movement of the rod 374 is tempered by the cam slot 370, i.e. the rod is caused to follow a path which is of a different combination of axial and radial movement than the combination of axial and radial movement of the link 222. This difference involves both rate and extent of axial and radial movement of the rod by reason of the rod being forced to move along a path defined by the cam slot 370. The rate and extent of movement of the wide segments 19 are a function of the shape of the cam slot and the position of the rod along the length dimension of the cam slot. For example, when the drum is expanded to its maximum diameter the rod will be disposed at the most radially inward end 390 of the cam slot, and conversely, when the drum is collapsed to its minimum diameter, the rod will be disposed at the most radially outward end of the cam slot.

Notably, the end 344 of the stub link 346 is mounted on, and anchored to the rod 374 as by a pin 375, so that the end 344 of the stub link moves commensurate with the movement of the rod 374 within the cam slot 370 and the narrow segment 18 is maintained axially aligned with the drum as the link 222 is pivoted toward or away from the rotational axis of the drum. Further, this pinning of the end 344 of the stub link 374 to the rod 374 serves to retain the length of the rod 374 centered within the cam slot 370.

Activation of the lead screw to reduce the diameter of the drum from its maximum diameter will result in pivotal movements of the linkages 20 and 20', and 23 and 23', hence commencement of both axial and radial inward movement of the wide segments 19. The rate and extent of this movement of the wide segments will change as the rod moves along the length dimension of the cam slot. By this means, the present inventor provides for axial and radial movement of the wide segments which is controlled by, hence is a function of the movement of the linkages 20, 20' and 23, 23' as modified by the cam slot. Since the linkages 20, 20' and 23, 23' also serve as the linkages for movement of the narrow segments, the inventor makes possible different rates and extent of axial and radial movement of the narrow segment 18, 18' and their associated wide segments 19,19', thereby providing for nesting of the segments as the diameter of the drum is decreased toward its minimum diameter.

Referring again to FIG. 2, in the lower half of FIGS. 2A and 2B there is depicted a typical mounting for one of the segments 18' of the second group of the narrow segments. The segment 18' depicted in FIG. 2 is mounted for axial and radial movement similarly to the axial and radial movement of the segment 18 which is depicted in the upper half of FIG. 2. Specifically, the mounting of the segment 18' includes a mounting lug 400 which receives therein one end 402 of a first link 404 that is pivotally mounted to the mounting lug 400 as by a pivot pin 406 having a pivot axis 408. The opposite end 230 of the link 404 is pivotally mounted to the mounting collar 184 of the first hub 130 by a pivot pin 225 having a pivot axis 228. It is to be noted, however, that the axial location of the pivot pin 224 is more distant from the transverse centerplane 62 of the drum than is the location of the pivot pin 226 which mounts the end 220 of the link 222 to the mounting collar 184 of the first hub 130. Also the distance between the pivot axis 408 of the pin 406 and the pivot axis 228 of the pin 224 which mount the opposite ends of the link 404 is slightly less than the distance between the pivot axis 226 of the pivot pin 224 and the pivot axis 338 of the pin 336 which mounts the opposite ends of the link 222 for reasons discussed hereinafter. Also similarly to the mounting of the segment 18, the segment 18' is connected to the second hub 134 as by means of an elongated link 409 having one of its ends 411 pivotally connected, as by a pivot pin 413 having a pivot axis 415, to the cutout 275 of the second hub 132. The opposite end 423 of the link 409 is pivotally mounted to the end 402 of the link 404 by means of a pivot pin 430 having a pivot axis 432. A stub link 410 having one of its ends 412 pivotally mounted by a pivot pin 411 having a pivot axis 413 to the mounting lug 400 of the segment 18' extends from the mounting lug 400 and into an open slot 414 in the inboard side 416 of the end 402 of the link 404 where its end 418 is mounted on a rod 420 which passes through a cam slot 422 defined through the thickness of the end 402 of the link 404. Referring also to FIG. 1, one end 424 of this rod 420 is slidably received in a mounting lug 426 provided on the inner surface 428 of an adjacent wide segment 19. The opposite end 430 of the rod 420 is slidably received in a bore provided in a mounting lug 432 which projects from the inner surface of a further wide segment 19 which is located on the opposite side of, and adjacent to, the narrow segment 18', thereby interconnecting these two wide segments to the linkage 23 which serves to mount to the narrow segment 18' to the first hub 130.

In accordance with one aspect of the present invention, it is desired that the three narrow segments 18 of subgroup 23 move axially and radially of the drum at a different rate of movement and by a different extent of movement, for any given rotation of the lead screw 42, than the axial and radial movement of the other three segments in subgroup 25 of the six narrow segments. It is to this end that the distance between the pivot axes 408 and 228 of the link 404 and the distance between the pivot axes 226 and 338 of the link 222 are spaced differently and the pivot axis 228 of the pivot pin 225 for the link 404 is spaced more distant from the transverse centerplane 62 of the drum than is the pivot axis 226 pivot pin 224 of the link 222. Specifically, by reason of these spatial relationships, for any given rotation of the lead screw which results in reduction of the diameter of the drum, the segment 18 will move a greater distance axially, but substantially the same distance radially relative to the axial and radial movement of the segment 18'. The movements of these segments occur simultaneously, but the difference in movements results in the segments 18 contracting axially sufficiently to allow the flanges 28' of the segment 18' to pass the flange 28 of the segment 18 and allow the segment 18' to at least partially overlie the segment 18 in a nesting attitude. By reason of the circumferential displacement of the segments 18 and 18', their respective linkages 20 and 23 can collapse substantially to the housing 21 thereby minimizing the radial position of these segments when the drum is fully collapsed to its minimum diameter. This nesting of the segments 18 and 18' and the interconnection of the flanking wide segments to the linkage of the segments 18 and 18', further provide for simultaneous axial and radial movement of these wide segments such that the flange 30 (typical) of the wide segments 19(typical) also can pass the flanges 28 and 28' of the segments 18 and 18' and allow the wide segments 19 to nest with the narrow segments 18 and 18'.

With reference to FIGS. 1, 3A and 55–56, there is depicted a first mounting lug 400 for one wide segment 19 (typical) which includes a body portion 450 having a longitudinal bore 452 which serves to slidably receive therein a connecting rod 453 that extends between the segment 19 (at the seven o'clock position in FIG. 1) and its counterpart segment 31 at the seven o'clock position on the opposite end of the drum (see also FIG. 3A and 3B) and whose opposite ends 454 and 456 are slidably disposed within the bores 452 and 452', respectively. Midway between the opposite ends of the rod 453 there is pinned a carrier bracket 458 which serves to mount the gap shield 460 that is associated with the wide segments 19 and 31.

The mounting lug 400 further includes first and second throughbores 462 and 464 each of which is adapted to slidably receive therethrough one end of the rods 420 and 421, respectively (see FIG. 1) which extend between ones of the wide segments which are disposed adjacent opposite sides of one of the narrow segments, and which further pass through respective cam slots in the linkages which serve to mount the narrow segments to their respective hubs. By reason of the sliding relationship of the rods 420 and 421 to the mounting lug 400, the mounting lug 400, hence its segments and shells are mounted for axial movement as the linkages of the narrow segments are moved axially and radially of the drum upon actuation of the lead screw.

Referring to FIG. 1 in particular, it will be recognized that the rods 420 and 421 (typical) slide through the same mounting lug 400 (typical), but in opposite directions. As the diameter of the drum is changed in diameter, the ends 424 and 430 of the rod 420 at times pass fully through and project from the mounting lugs 400 on opposite sides of the mounting lug. Thus it will be recognized that the rods 420 and 421 (typical) must bypass one another within their mounting lug. To this end, the bores 462 and 464 on the mounting lug 400, for example, are offset axially of the drum. This offsetting of these bores is further accommodated by reason of the fact that the pivot axes of the ends 320 and 226 of the link 222 are axially offset relative to the pivot axes 228 and 408 of the link 404 as noted hereinbefore.

Recalling that the segments 18 and 18' move axially and radially at different rates of movement by reason of their linkage mountings to their respective hubs, and referring to FIGS. 1 and 2 in particular, it will be recognized that the rod 374 slides through the mounting lugs 386 and 378 of the two wide segments 19 that are disposed on opposite sides of the segment 18 located at the 12:00 o'clock position in FIG. 1. As the diameter of the drum is reduced toward its minimum diameter, the ends 382 and 376 of the rod 374 project through their respective mounting lugs. Still referring to FIG. 1, it will also be noted that the segment 19 which is in the 1:00 o'clock position in FIG. 1 is also connected by a rod 377 to the narrow segment 18' which is immediately next in circumferential clockwise position to the segment 19 (in the 2:00 o'clock position in FIG. 1). The end 381 of this further rod 377 is slidably received in the mounting lug 378 of the segment 19. The opposite end 383 of the rod 377 is slidably received in the mounting lug 385 of the segment 19 which is in the 3:00 o'clock position in FIG. 1. Further recalling that the segments 18 and 18' move at different rates of axial and radial movement, it will be recognized that these different rates of movement generate different rates of axial and radial movement of the wide segments 19 that are "slaved" to the linkages of the narrow segments.

In FIG. 21, the phantom lines depict the position of all the shells 1–12 when the drum is expanded to its maximum diameter. In their expanded positions, the shells attached to the segments collectively define an outer cylindrical surface 32 of the depicted end of the drum. The solid lines represent the same shells (and their segments), but in their collapsed positions when the drum is retracted to its minimum diameter. The segments depicted in FIG. 21 include respective shell members affixed to each segment, the flange portions of which are depicted in the plane of FIG. 21.

Axial movement of the shells is depicted in FIG. 21 by showing the nesting positions of the various shells. Specifically, shells 3,7 and 11 constitute group 17 and are shown to be the most axially inboard of all the shells. Shells 1,5 and 9 constitute the group 15 of the six narrow shells and are shown to be more axially outboard of the shells 3,7 and 11, but axially inboard of shells 2,4,6,8,10 and 12. Finally, shells 2,4,6,8,10 and 12, which comprise the wide shells and constitute the group 23 are the most axially and radially outboard ones of the shells. The depicted arrangement of alternating narrow and wide segments about the circumference of the drum permits the use of that minimum number of segments which will define the desired maximum diameter of the drum and will provide for the segments to move axially and radially out of the path of others of the segments when changing the drum diameter.

From FIG. 21, it is apparent that minimization of the diameter of the drum is effected by division of the shells into several groups in which the segments of the groups are alternatingly positioned about the circumference of the drum, and then moving each group axially and radially substantially simultaneously by different amounts (and different rates) of movement such that all the shells are movable to radially inward positions adjacent the central housing 21 of the drum. This capability of drum diameter reduction provides about a 1.6:1 ratio of minimum diameter to maximum diameter of the drum. No prior art drum is known to exhibit a ratio which is within about 10% of this ratio without disassembly of the drum for removal of a toroidal product formed on its outer circumference. In a drum having a maximum diameter of 28 inches, for example, it is possible in the present drum to achieve a minimum diameter of 17.5 inches. Known prior art drums having a maximum diameter of 28 inches are capable of collapsing to a minimum diameter of only about 19" inches but only by dissembling the drum to remove the green tire from the drum and reassembling the drum in preparation for the formation of a further tire. Thus, without disassembly, the present drum may be employed in the manufacture of OTR tires, for example, which have an outer diameter of about 28 inches and which require a minimum diameter in the range of about 17.5 inches. Maximum axial compression of the width of the present drum in this example is about 22% of the overall maximum width of the drum, thereby providing for the axial withdrawal of the shells by an amount which will permit the passage of tire sidewalls which are undercut to about a 55° profile for any tire diameter within the range of diameters of the present drum.

Figure 22:
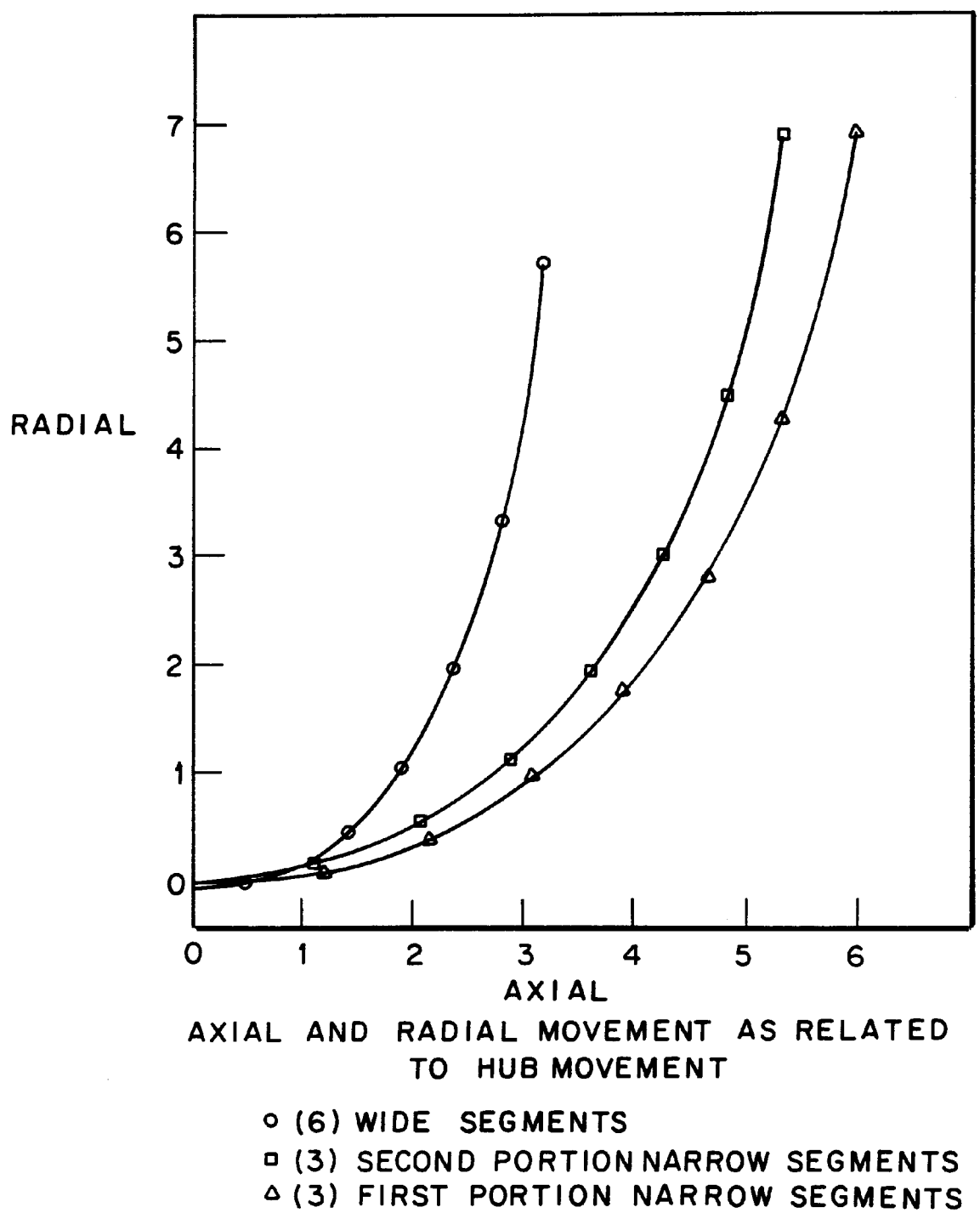
FIG. 22 is a graphic representation of the axial and radial movement of various portions of segments relative to hub movement.
Figure 23:
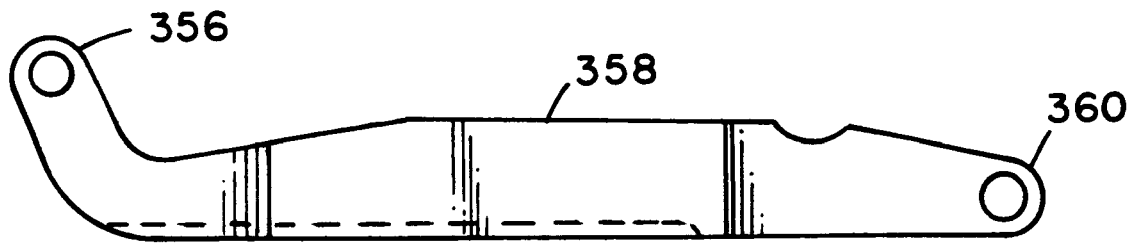
FIG. 23 is a front elevational view of a first link employed for mounting selected segments to respective hubs of one embodiment of the drum of the present invention.
Figure 24:
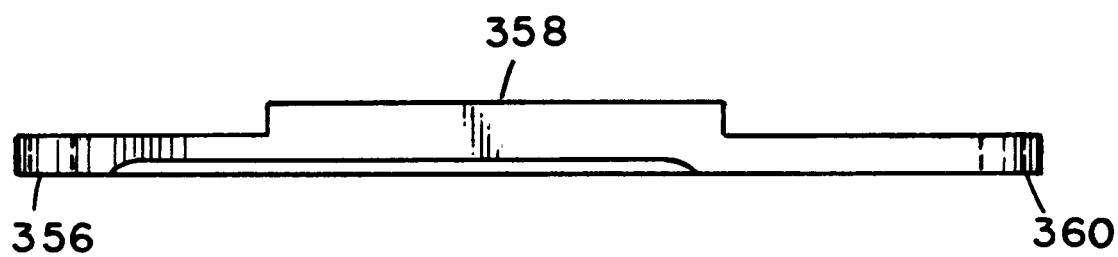
FIG. 24 is a side elevational view of the first link depicted in FIG. 23.
Figure 25:
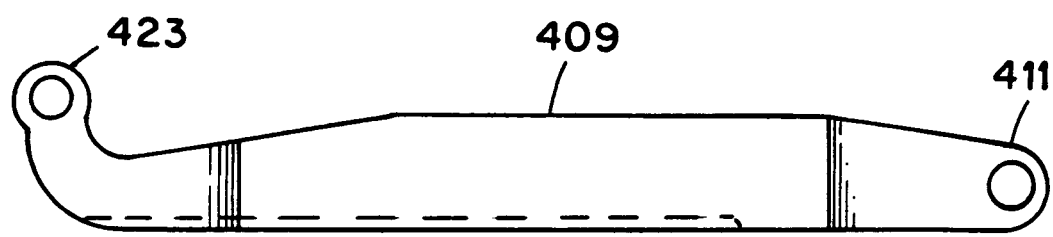
FIG. 25 is a front elevational view of a second link employed for mounting selected segments to respective hubs of one embodiment of the drum of the present invention.
Figure 26:
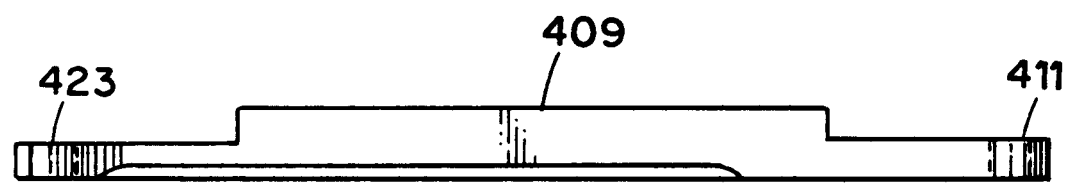
FIG. 26 is a side elevational view of the second link depicted in FIG. 25.
Figure 35:
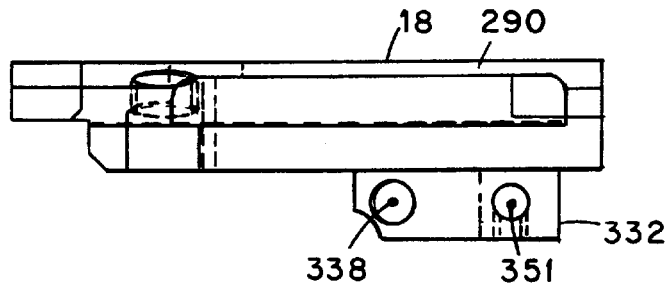
FIG. 35 is a side view of a first narrow width segment as employed in one embodiment of the drum of the present invention.
Figure 36:
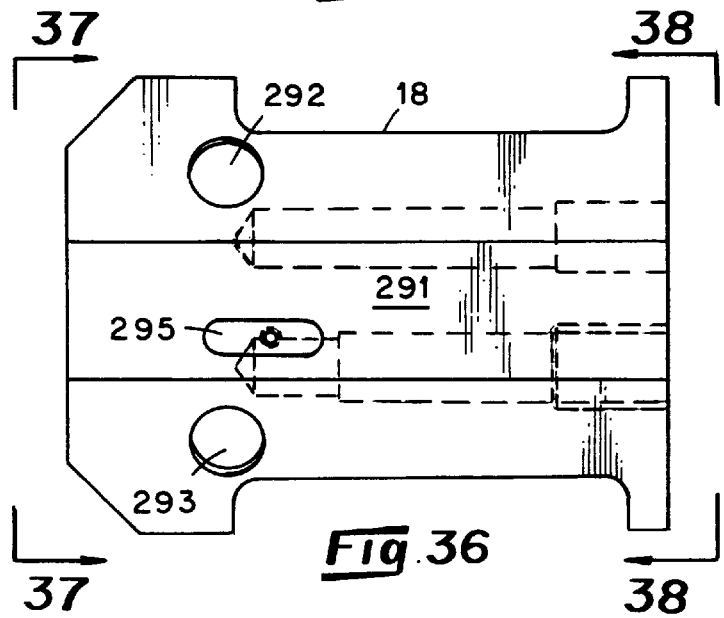
FIG. 36 is a top plan view of the segment depicted in z FIG. 35.
Figure 37:
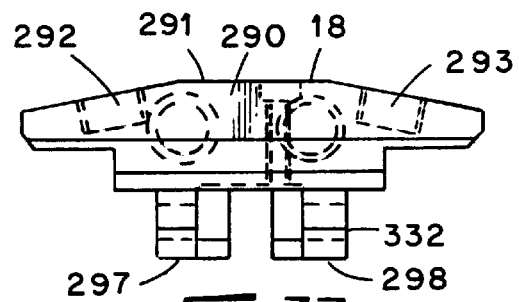
FIG. 37 is an end view of the segment depicted in FIG. 35 and taken generally along the line 37—37 of FIG. 35.
Figure 38:
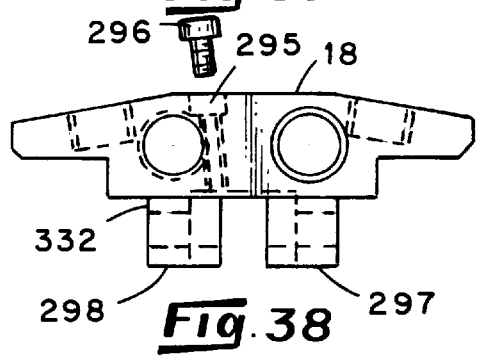
FIG. 38 is an end view of the segment depicted in FIG. 35 and taken generally along the line 38—38 of FIG. 35.
Figure 45:
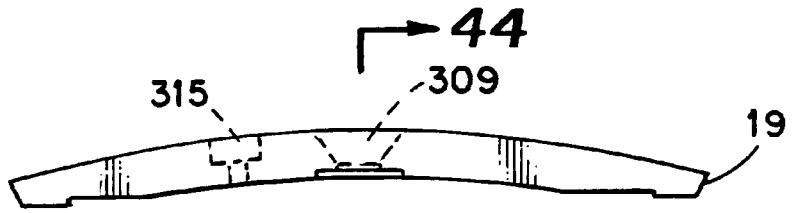
FIG. 45 is an end view of the segment depicted in FIG. 43 and taken generally along the line 45—45 of FIG. 43.
Figure 44:
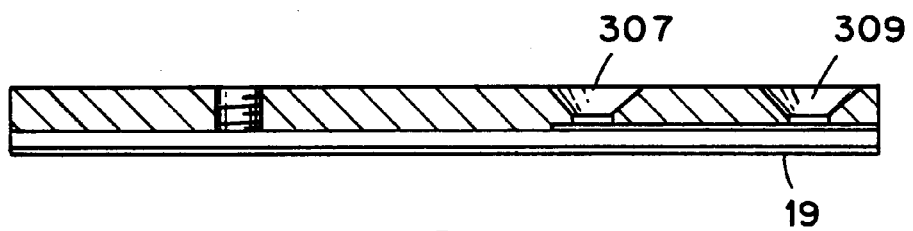
FIG. 44 is a side view, in section, of the segment depicted in FIG. 43 and taken generally along the line 44—44 of FIG. 43.
Figure 43:
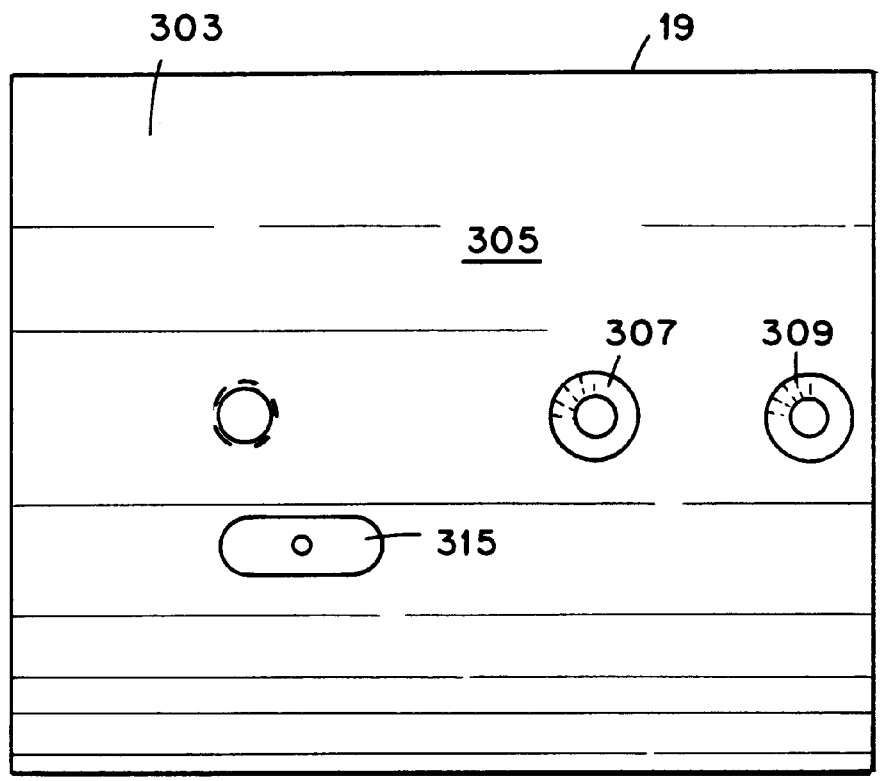
FIG. 43 is a top plan view of a wide width segment as employed in one embodiment of the drum of the present invention.

FIG. 22 depicts the relationship of the axial and radial movement of the various group or subgroups of the segments relative to the movement of the hubs to which the segments are connected. In this Figure it is seen that both the axial and radial movement of each group of segments is different from the axial and radial movement of the other groups of the segments for any given unit(s) of rotation of the lead screw 42. Specifically it is seen that for a given rotation of the lead screw, the first group 15 of the narrow segments move faster and further, both axially and radially, than either the second group 17 of narrow segments or the group 23 of wide segments. As depicted, the second group of narrow segments moves axially and radially faster and further than the group 23 of wide segments. The result is a nesting of all the segments adjacent the rotational axis of the drum upon collapse of the drum to its minimum diameter.

In FIGS. 2 and 27–30 there is depicted a first one 222 of two elongated links which connect a narrow segment 18 to its respective hubs 130 and 134. As noted hereinbefore this link 222 is provided with a cam slot 370 which extends through the thickness of the link. A rod 374 passes through the cam slot to mount circumferentially adjacent wide segments to the narrow segment. In the present invention, the inner surface 372 of the cam slot functions as a camming surface such that as the link 222 is moved radially, the rod slides within, and is guided both axially and radially of the drum as the link moves. The contour of the inner surface, therefore, regulates, to an extent, the rate of axial and radial movement of the wide segments that are attached to the opposite ends or the rod as well as the extent of such axial and radial movement of these wide segments.

In FIGS. 29 and 30 there is specifically described the contour of the inner surface of an suitable cam slot in the specific example of a drum having a desired maximum outer diameter of 28 inches and a minimum outer diameter of 17.5 inches, and a minimum overall axial movement of about two inches for each segment (a total of about four inches of overall drum width). Also depicted in FIGS. 29 and 30 is the spatial relationship of the cam slot to the pivot axis 226 of the end 220 of the link 222. Cam slots for links employed in drums of other desired maximum and minimum diameters will vary from the given example, depending upon the desired maximum and minimum diameters of the drum, but the principles disclosed herein and in the Figures apply to such other drum diameters.

In FIG. 34, there is depicted the inner surface contour 421 of the cam slot 422 provided in the link 404 which is employed in the present example of a drum having a maximum diameter of 28 inches and a minimum diameter of 17.5 inches, and a minimum overall axial movement of about 2 inches for each segment. Also depicted is the spatial relationship of the cam slot to the pivot axis 228 of the end 230 of the link 404.

It is to be noted that in the present example, the lead screw 42 includes a first set of external threads having a pitch of ¼" and 4 threads per inch which serve to drive the first hub 130 axially of the drum and a second set of external threads having a pitch of ⅜" and 2.66 threads per inch which serve to drive the second hub 132 axially of the drum. As described, identical threads, but of different hand, are provided on the lead screw to drive hubs 134 and 136 axially of the drum.

Whereas the present invention has been described in terms of a specific drum, it will be recognized by one skilled in the art that the concepts of the present invention are applicable to drums of different sizes and having different numbers of segments (shells). It is therefore intended that the invention be limited only as set forth in the claims appended hereto.

What is claimed:

1. A rotatable drum for use in the manufacture of vehicle tires, the drum including a plurality of segments which collectively define an outer circumference of the drum, said segments being divided into first and second end portions which are individually mounted for axial and radial movement between expanded and collapsed positions relative to the rotational axis of the drum, characterized by each of said end portions being separately linked for axial movement toward and away from one another in a direction substantially parallel to the rotational axis of the drum, and further being divided into first and second groups, said segments of said first group being disposed in alternating juxtaposition about the circumference of the drum with respect to said segments of said second group, with said segments of said first group being movable substantially simultaneously axially further and radially faster than said segments of said second group as said segments are moved between their expanded and collapsed positions so that said segments of said second group are received in overlying relationship to said segments of said first group as said segments of said first and second groups are simultaneously moved radially inward toward the rotational axis of the drum.

2. The rotatable drum of claim 1 and including a third group of said segments of each of said first and second end portions of segments, said segments of said third group being movable axially slower and radially less than said segments of said second group of segments so that said segments of said third group are received in overlying relationship to said segments of said second group as said segments of said first, second and third groups are simultaneously moved radially inward toward the rotational axis of the drum.

3. The rotatable drum of claim 2 wherein said third croup of segments are operatively connected to said first and second groups of segments so that axial and radial movement of said third group of segments is a slave function of the axial and radial movements of said first and second groups of segments.

4. The rotatable drum of claim 3 wherein axial and radial movement of said third group of segments is cam-controlled.

5. The rotatable drum of claim 2 and including a shell member having an outer arcuate surface mounted on each of said segments and moveable axially and radially therewith.

6. The rotatable drum of claim 5 wherein said shell members mounted on said third group exhibit a width that is greater than the width of the segments of said first and second groups of segments.

7. The rotatable drum of claim 1 and including a shell member having an outer arcuate surface mounted on each of said segments and moveable axially and radially therewith.

\* \* \* \* \*